US012628975B2

(12) United States Patent
Hori et al.

(10) Patent No.: US 12,628,975 B2
(45) Date of Patent: May 19, 2026

(54) ELECTRIC KETTLE

(71) Applicant: MAKITA CORPORATION, Anjo (JP)

(72) Inventors: Atsushi Hori, Anjo (JP); Yasuyuki Fujimoto, Anjo (JP)

(73) Assignee: Makita Corporation, Anjo (JP)

( * ) Notice: Subject to any disclaimer, the term of this patent is extended or adjusted under 35 U.S.C. 154(b) by 1110 days.

(21) Appl. No.: 17/533,685

(22) Filed: Nov. 23, 2021

(65) Prior Publication Data

US 2022/0167774 A1 Jun. 2, 2022

(30) Foreign Application Priority Data

Dec. 1, 2020 (JP) .................................. 2020-199410
Aug. 20, 2021 (JP) ................................. 2021-134628

(51) Int. Cl.
*A47J 27/21* (2006.01)

(52) U.S. Cl.
CPC ..... *A47J 27/2105* (2013.01); *A47J 27/21166* (2013.01)

(58) Field of Classification Search
CPC ........................ A47J 27/2105; A47J 27/21166; A47J 27/212; A47J 27/21141; A47J 27/21083; A47J 27/21041; A47J 2203/00; A47J 2202/00; A47J 31/005; A47J 31/057; A47J 31/4439

(Continued)

(56) References Cited

U.S. PATENT DOCUMENTS 2,609,478 A * 9/1952 Crawford .............. A47J 31/053
99/282
2,863,037 A * 12/1958 Johnstone ........... A47J 36/2466
165/135

(Continued)

FOREIGN PATENT DOCUMENTS

CN 110123140 A 8/2019
CN 210471896 U 5/2020

(Continued)

OTHER PUBLICATIONS

Mar. 12, 2024 Office Action issued in Japanese Patent Application No. 2020-199410.

(Continued)

*Primary Examiner* — Eric S Stapleton
(74) *Attorney, Agent, or Firm* — Oliff PLC

(57) ABSTRACT

An electric kettle includes: a kettle body having a power receiving connection part and a heating part; a power supply unit including a power supply base having a power supply connection part, and a mounting unit; and a detection part. The detection part is configured to detect whether the kettle body is on the power supply base. The electric kettle is configured to supply power to the heating part via the power supply connection part and the power receiving connection part when the detection part detects that the kettle body is on the power supply base, and to stop power supply to the heating part when the detection part detects that the kettle body is not on the power supply base. The power supply connection part and the power receiving connection part are disconnected after the detection part detects that the kettle body is not on the power supply base.

19 Claims, 22 Drawing Sheets

(58) Field of Classification Search
USPC ....................... 99/280, 275–323.3, 467–483;
165/200–303, 58–68, 86–93, 109.1–127,
165/177–186; 219/200–209, 385–553;
307/11–87; 455/73–90.3, 127.1–128
See application file for complete search history.

(56)                  References Cited

U.S. PATENT DOCUMENTS

| | | | | |
|---|---|---|---|---|
| 4,812,623 | A * | 3/1989 | Haden ................ | H01R 13/7036 |
| | | | | 439/138 |
| 5,694,115 | A * | 12/1997 | Desatoff ............... | A47J 31/521 |
| | | | | 307/140 |
| 7,145,105 | B2 * | 12/2006 | Gaulard ............ | A47J 27/21066 |
| | | | | 219/432 |
| 8,208,801 | B2 * | 6/2012 | Brown .................. | A47J 27/004 |
| | | | | 392/441 |
| 8,263,906 | B2 * | 9/2012 | Jarvis ................... | A47J 39/006 |
| | | | | 219/541 |
| 8,536,490 | B2 * | 9/2013 | Zhang ................ | A47J 27/2105 |
| | | | | 219/209 |
| 9,006,922 | B2 * | 4/2015 | Lee ......................... | B60L 50/20 |
| | | | | 307/9.1 |
| 9,974,401 | B2 * | 5/2018 | Alexander .............. | F25B 21/04 |
| 12,383,089 | B2 * | 8/2025 | Hori .................... | A47J 27/2105 |
| 2006/0207986 | A1 * | 9/2006 | Brown .................. | A47J 27/004 |
| | | | | 219/442 |
| 2009/0084270 | A1 * | 4/2009 | Pinheiro ............... | A47J 31/005 |
| | | | | 99/280 |
| 2009/0277896 | A1 * | 11/2009 | Brown .................. | A47J 27/004 |
| | | | | 219/494 |
| 2011/0240624 | A1 * | 10/2011 | Zhang ................ | A47J 27/2105 |
| | | | | 219/209 |
| 2011/0278280 | A1 * | 11/2011 | Brattoli ................ | A47J 39/006 |
| | | | | 219/443.1 |
| 2012/0064470 | A1 * | 3/2012 | Delattre .............. | A47J 36/2433 |
| | | | | 219/386 |
| 2012/0091117 | A1 * | 4/2012 | Cheng ................ | A47J 27/2105 |
| | | | | 219/385 |

| | | | | |
|---|---|---|---|---|
| 2013/0187461 | A1 * | 7/2013 | Goto ..................... | A47J 31/005 |
| | | | | 307/38 |
| 2014/0069606 | A1 * | 3/2014 | Lee ........................... | A61J 9/08 |
| | | | | 165/63 |
| 2016/0374500 | A1 * | 12/2016 | Bugatti .............. | A47J 27/21141 |
| | | | | 219/435 |
| 2017/0098949 | A1 | 4/2017 | Goto et al. | |
| 2019/0021538 | A1 * | 1/2019 | Kondo .................... | A23F 5/262 |
| 2019/0104880 | A1 * | 4/2019 | Ghalambor Dezfuli .................... | |
| | | | | A47J 31/005 |
| 2022/0104649 | A1 * | 4/2022 | Ahn .................. | A47J 27/21066 |
| 2022/0117435 | A1 * | 4/2022 | Hori .................. | A47J 27/21166 |
| 2022/0167775 | A1 * | 6/2022 | Hori ..................... | H05B 1/0202 |

FOREIGN PATENT DOCUMENTS

| | | |
|---|---|---|
| CN | 111887716 A | 11/2020 |
| CN | 112006536 A | 12/2020 |
| JP | S49-20149 U | 2/1974 |
| JP | 2008-532703 A | 8/2008 |
| JP | 2010-082382 A | 4/2010 |
| JP | 2012-080990 A | 4/2012 |
| JP | 2012-139461 A | 7/2012 |
| WO | 2018/074355 A1 | 4/2018 |

OTHER PUBLICATIONS

May 29, 2025 Office Action issued in Chinese Patent Application No. 202111445731.3.

Jan. 15, 2025 Office Action issued in U.S. Appl. No. 17/533,726.

U.S. Appl. No. 17/533,726, filed Nov. 23, 2021 in the name of Atsushi Hori et al.

Mar. 18, 2025 Office Action issued in Japanese Patent Application No. 2021-134628.

Oct. 23, 2025 Office Action issued in Chinese Patent Application No. 202111445731.3.

Feb. 10, 2026 Office Action issued in Chinese Application No. 2021 1144 5680.4.

* cited by examiner

【FIG.1】
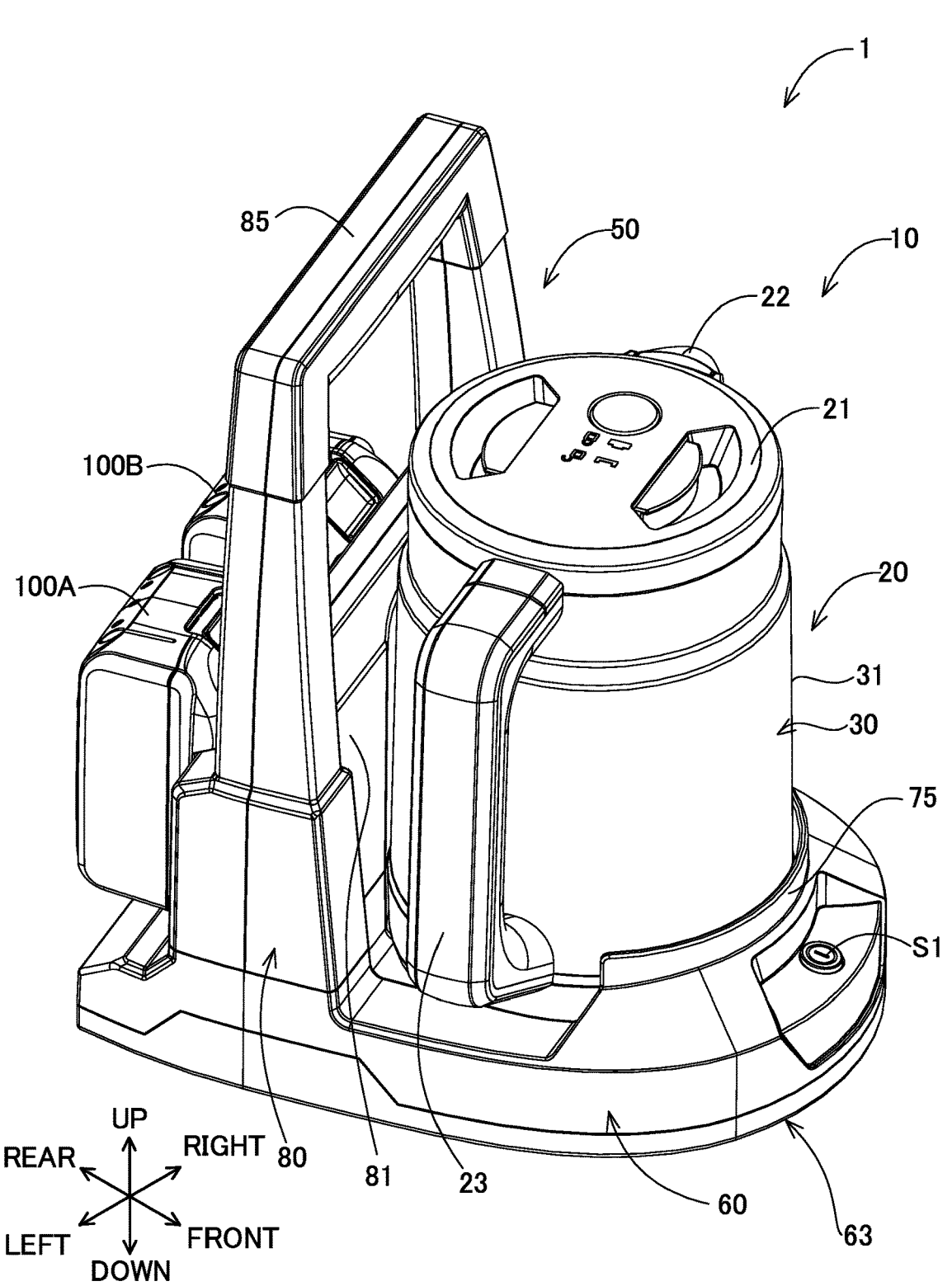
REAR · UP · RIGHT
LEFT · DOWN · FRONT

【FIG.2】
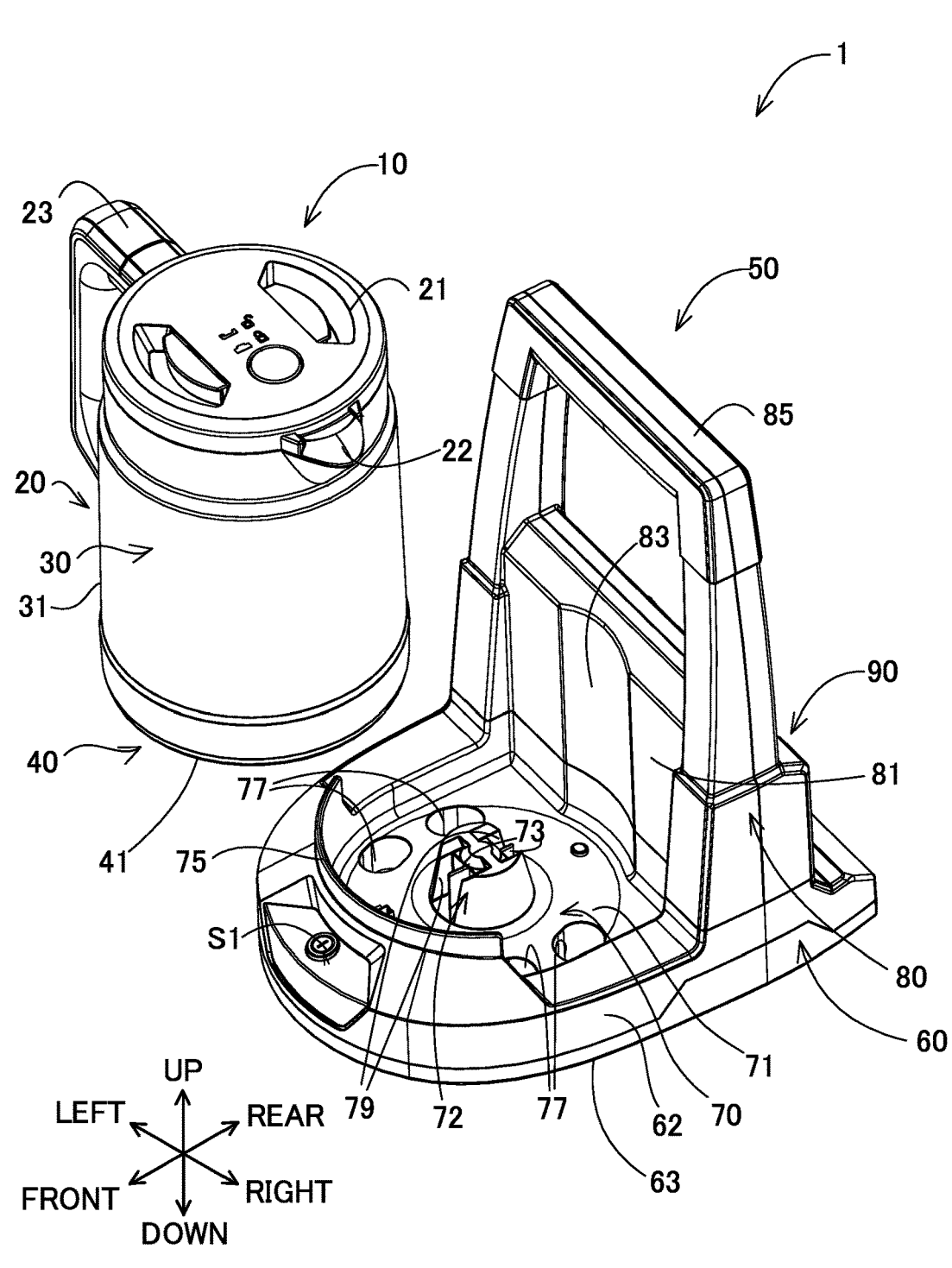
UP
LEFT
REAR
FRONT
RIGHT
DOWN

【FIG.3】
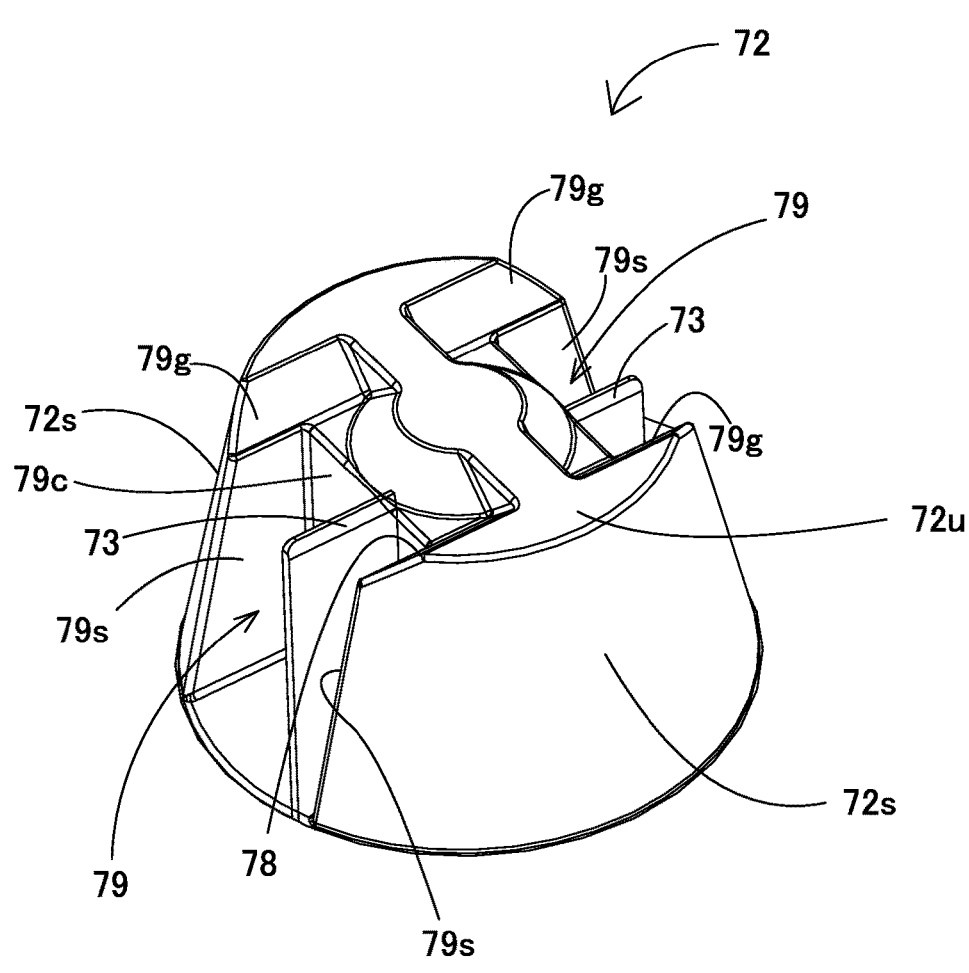
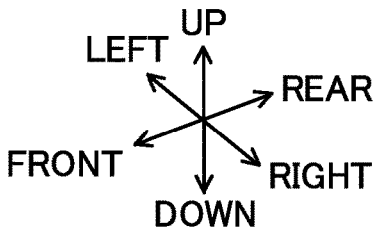

【FIG.4】
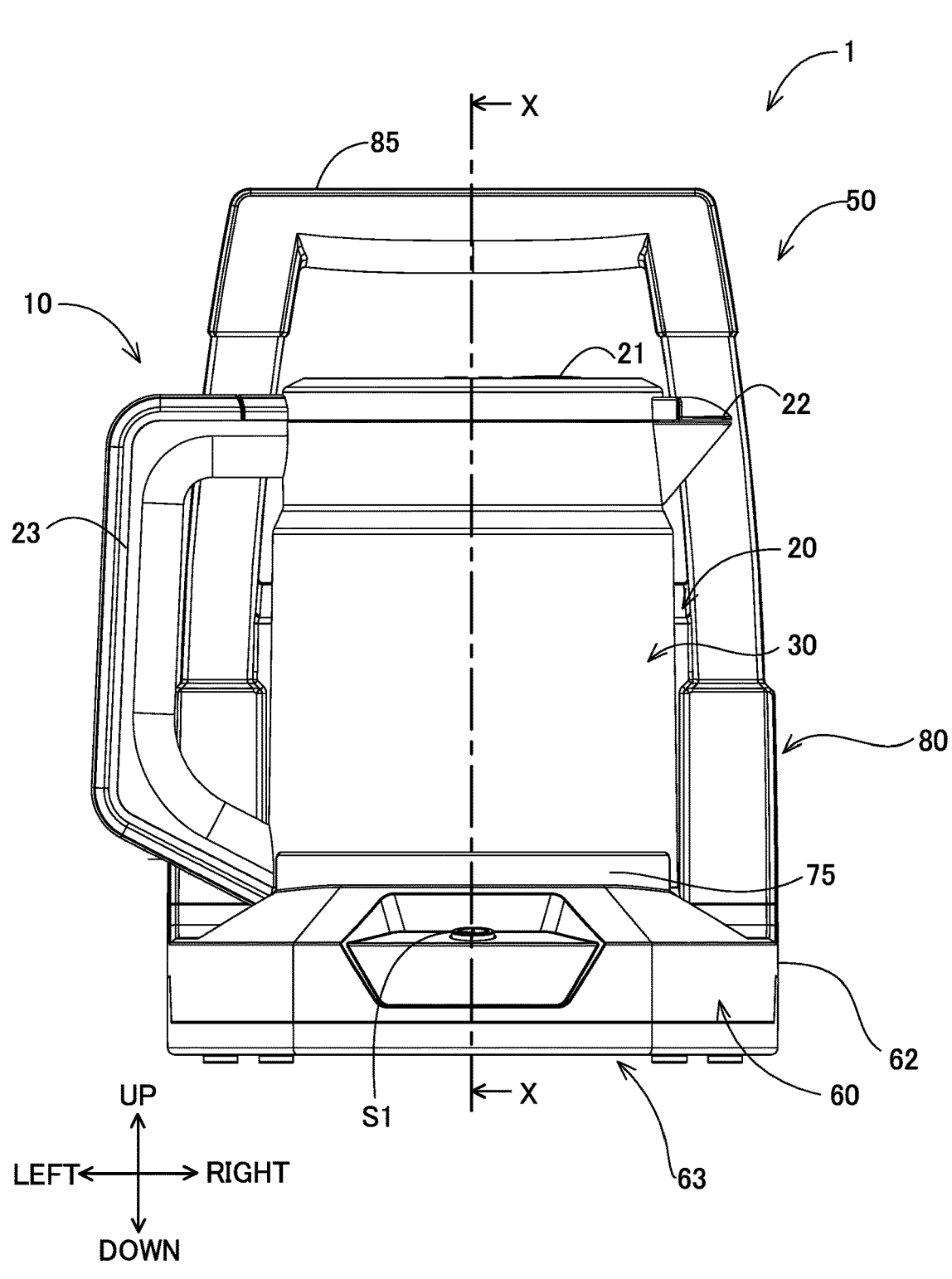

【FIG.5】
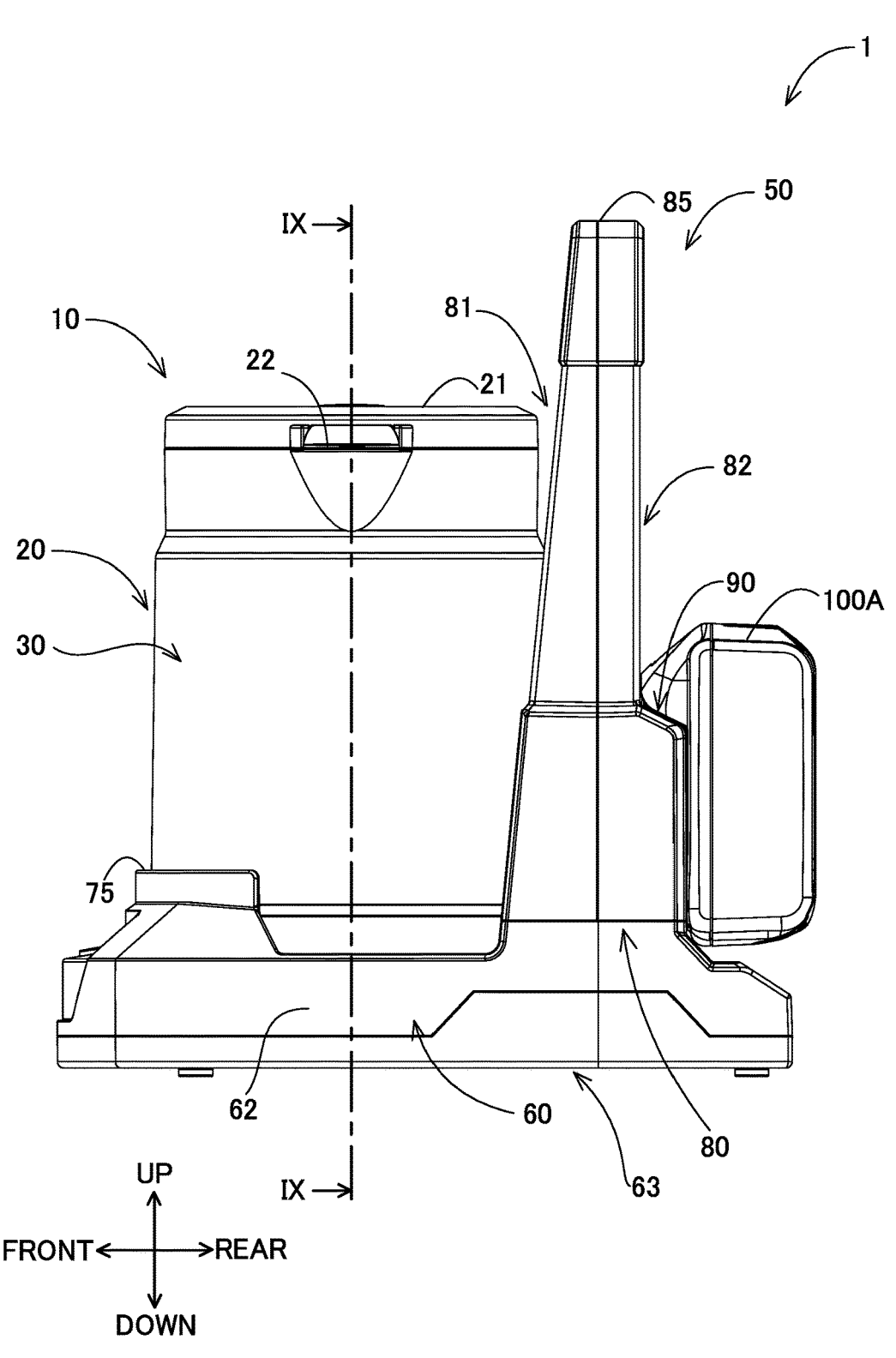

【FIG.6】
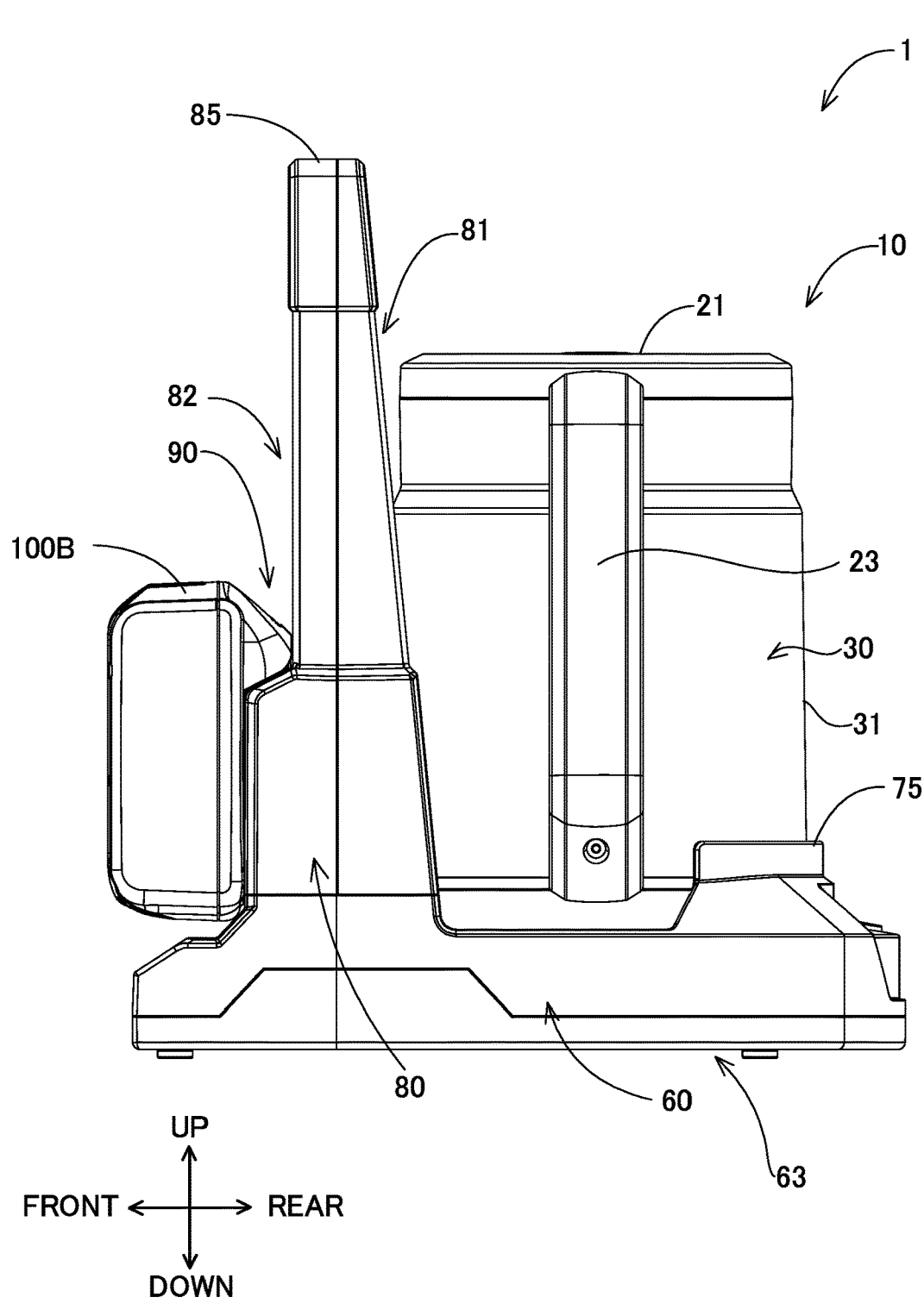

【FIG.7】
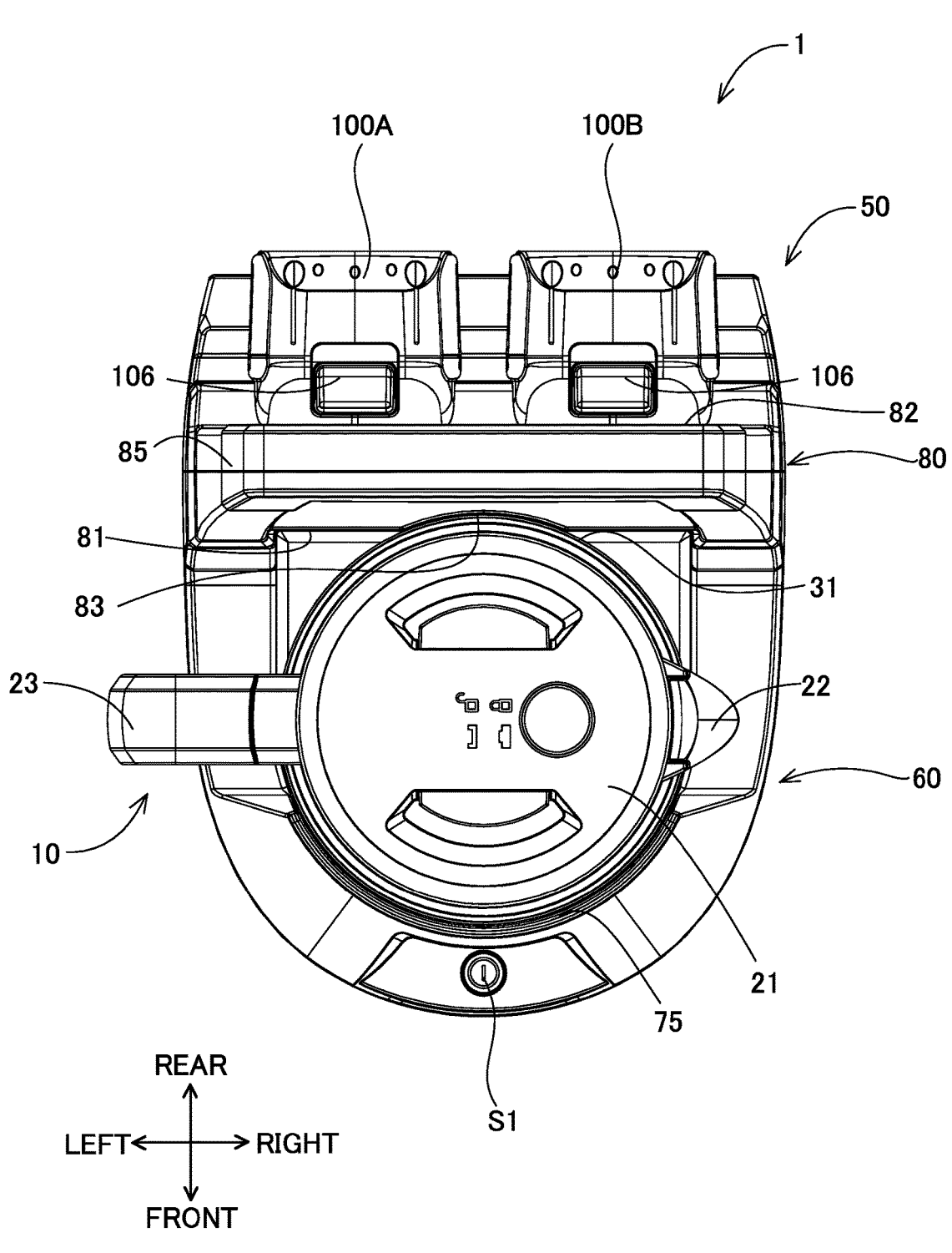

【FIG.8】
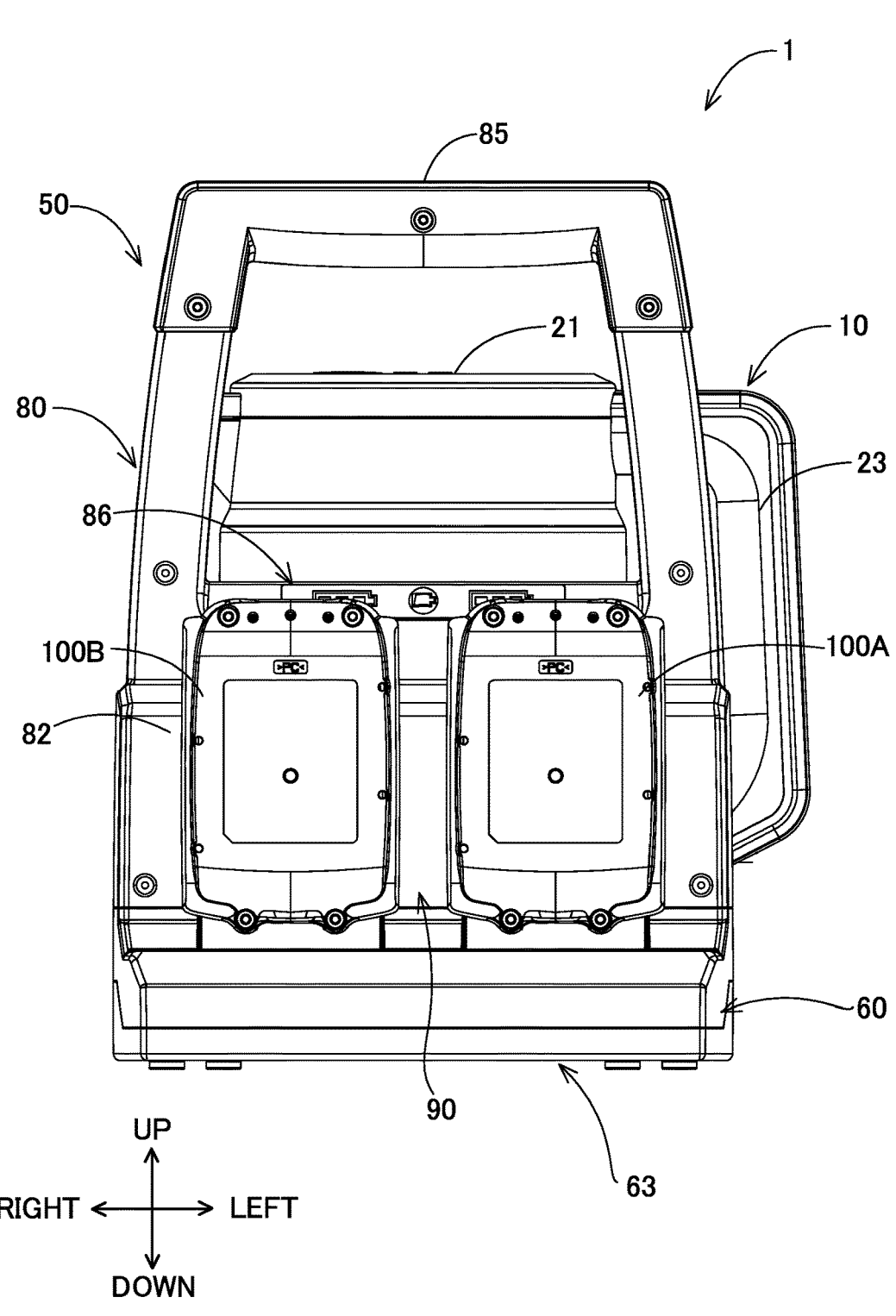
UP
RIGHT ← → LEFT
DOWN

【FIG.9】
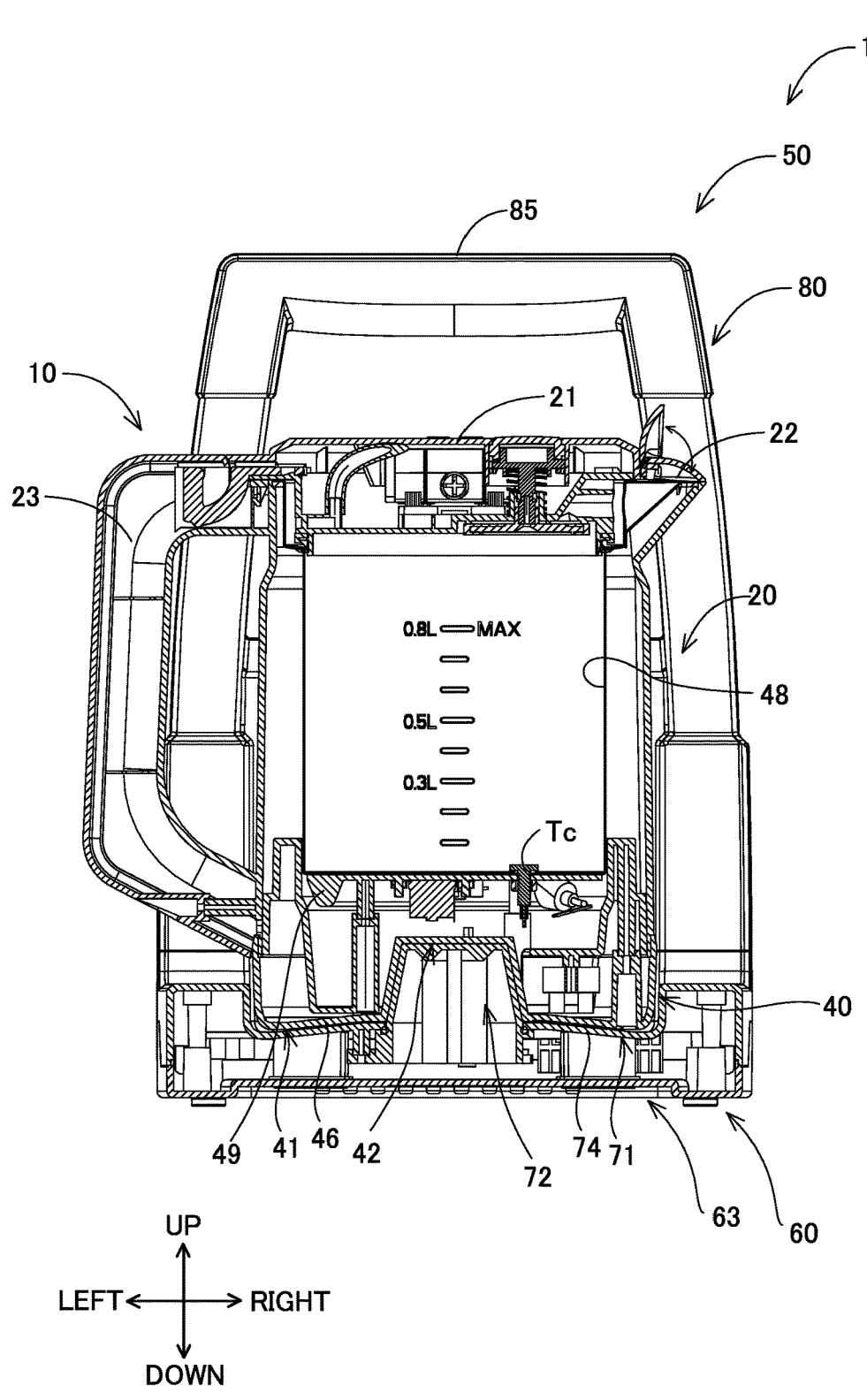

【FIG.10】
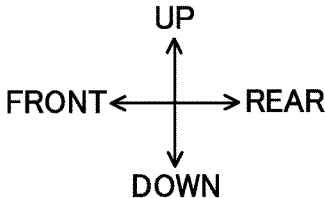
UP
FRONT ←——→ REAR
DOWN

【FIG.11】
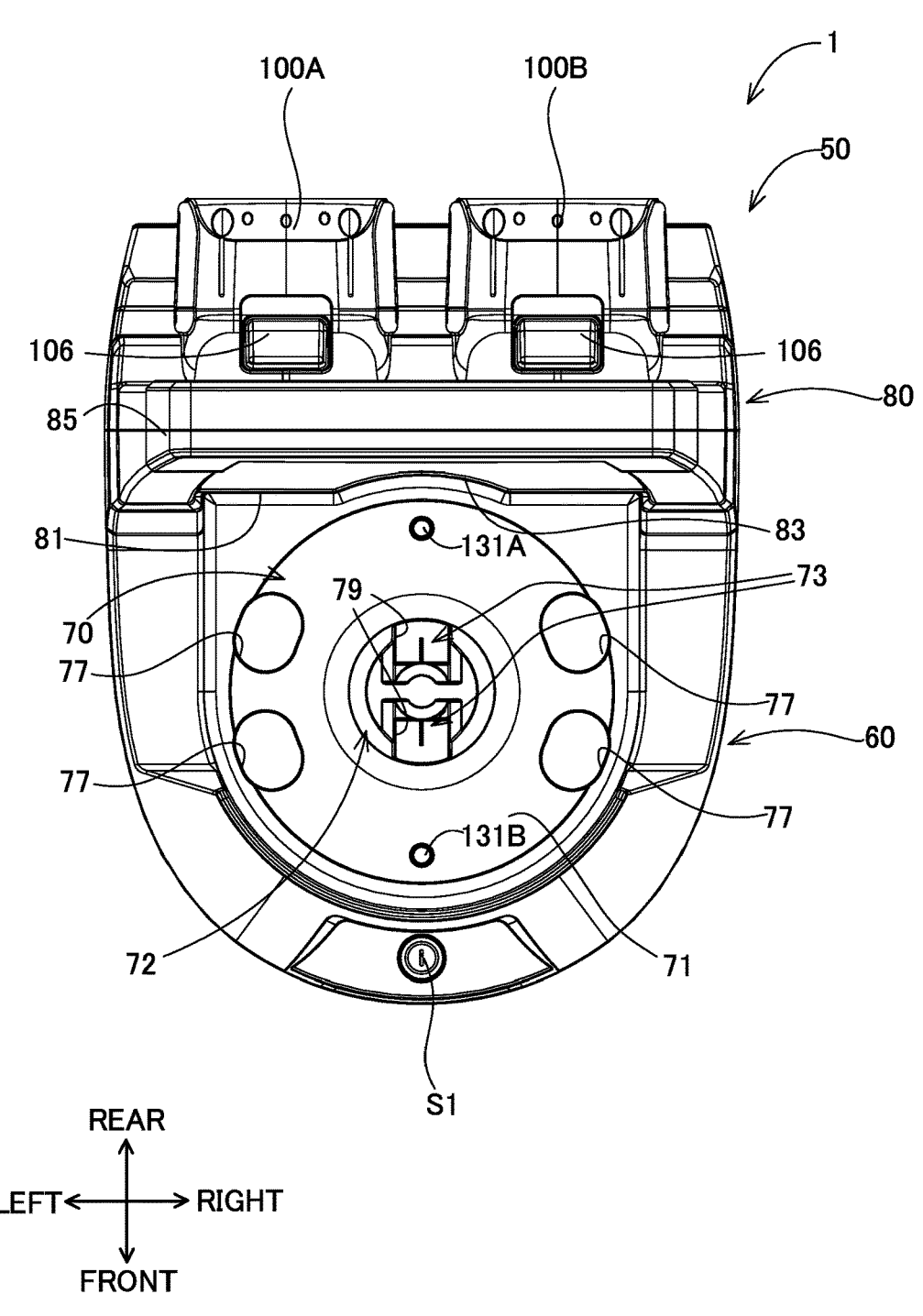
REAR
LEFT ← → RIGHT
FRONT

【FIG.12】
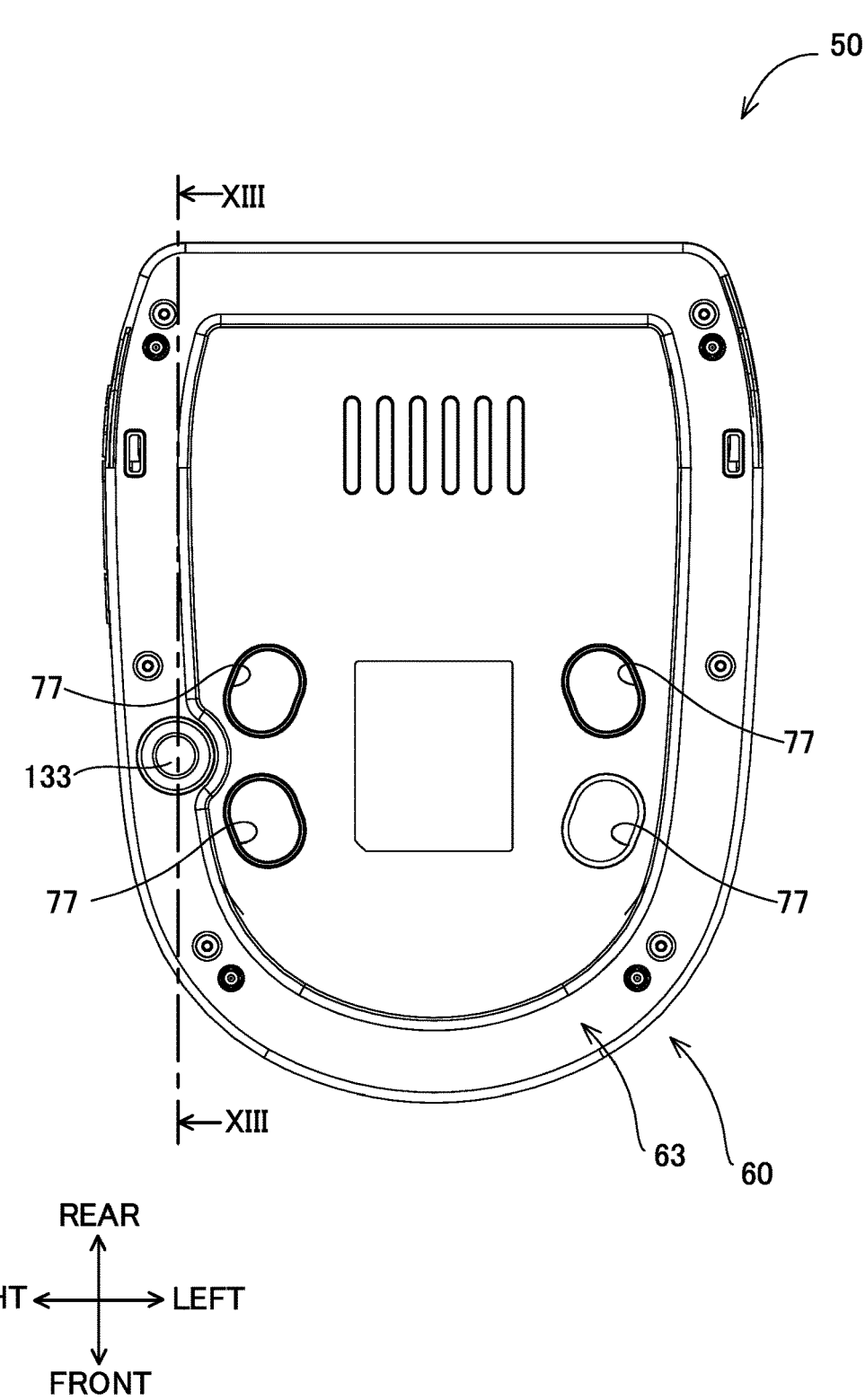
REAR
RIGHT ←→ LEFT
FRONT

【FIG.13】
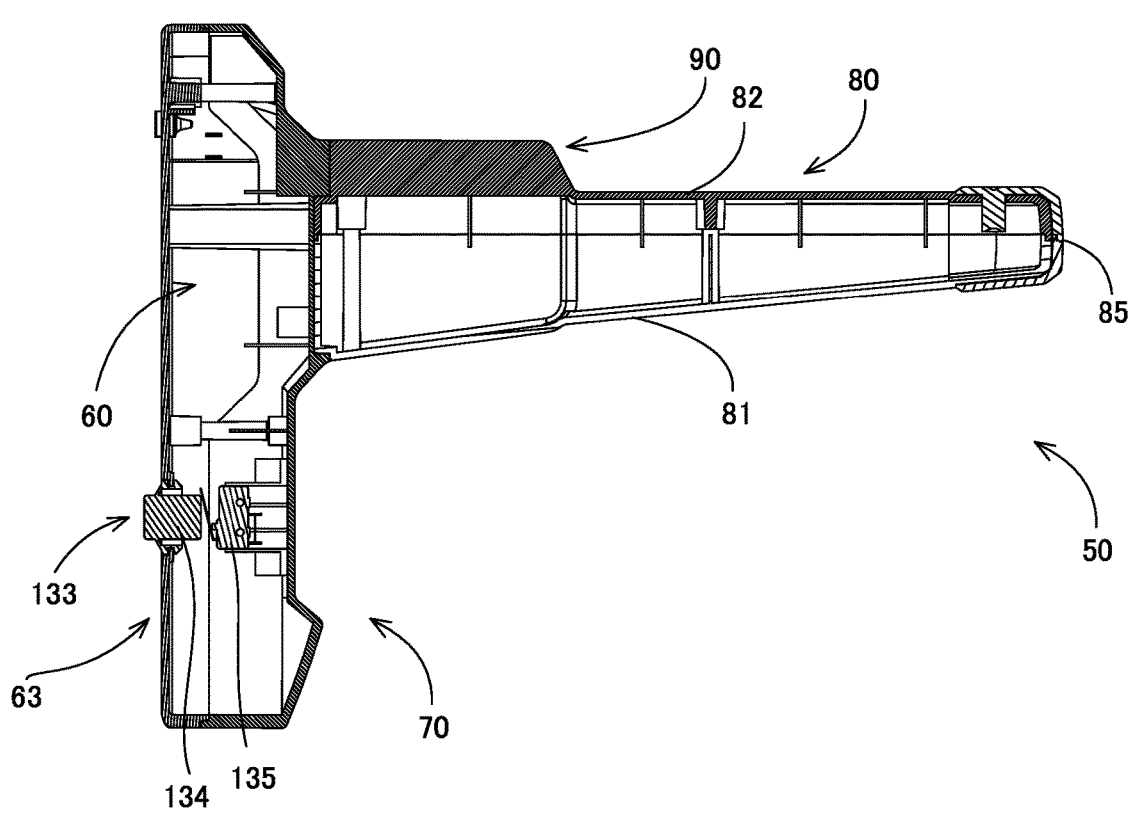
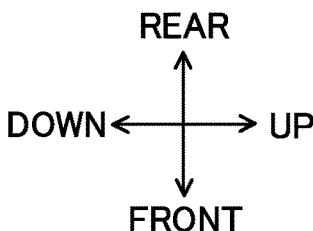

【FIG.14】
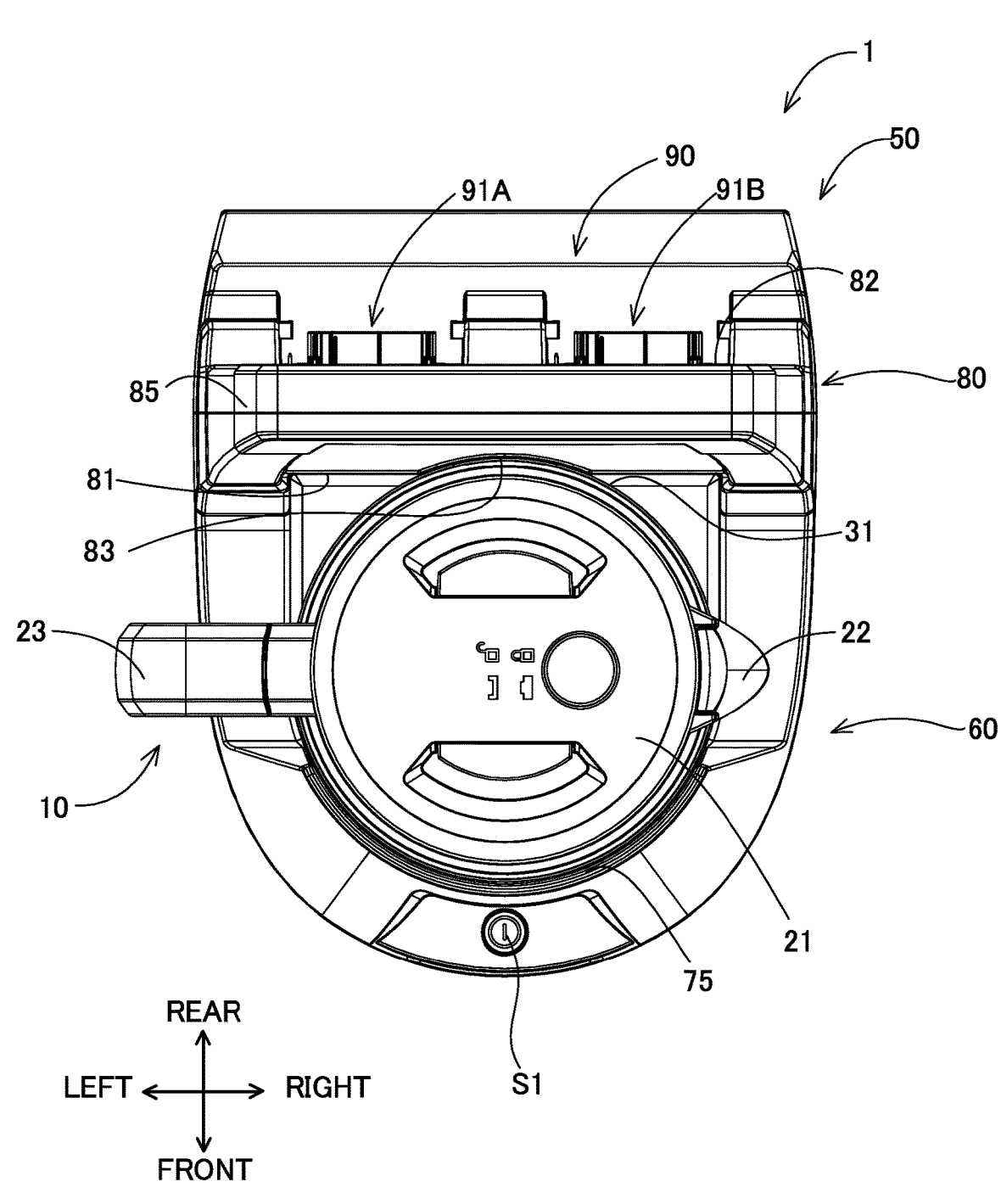
REAR
LEFT ←→ RIGHT
FRONT

【FIG.15】
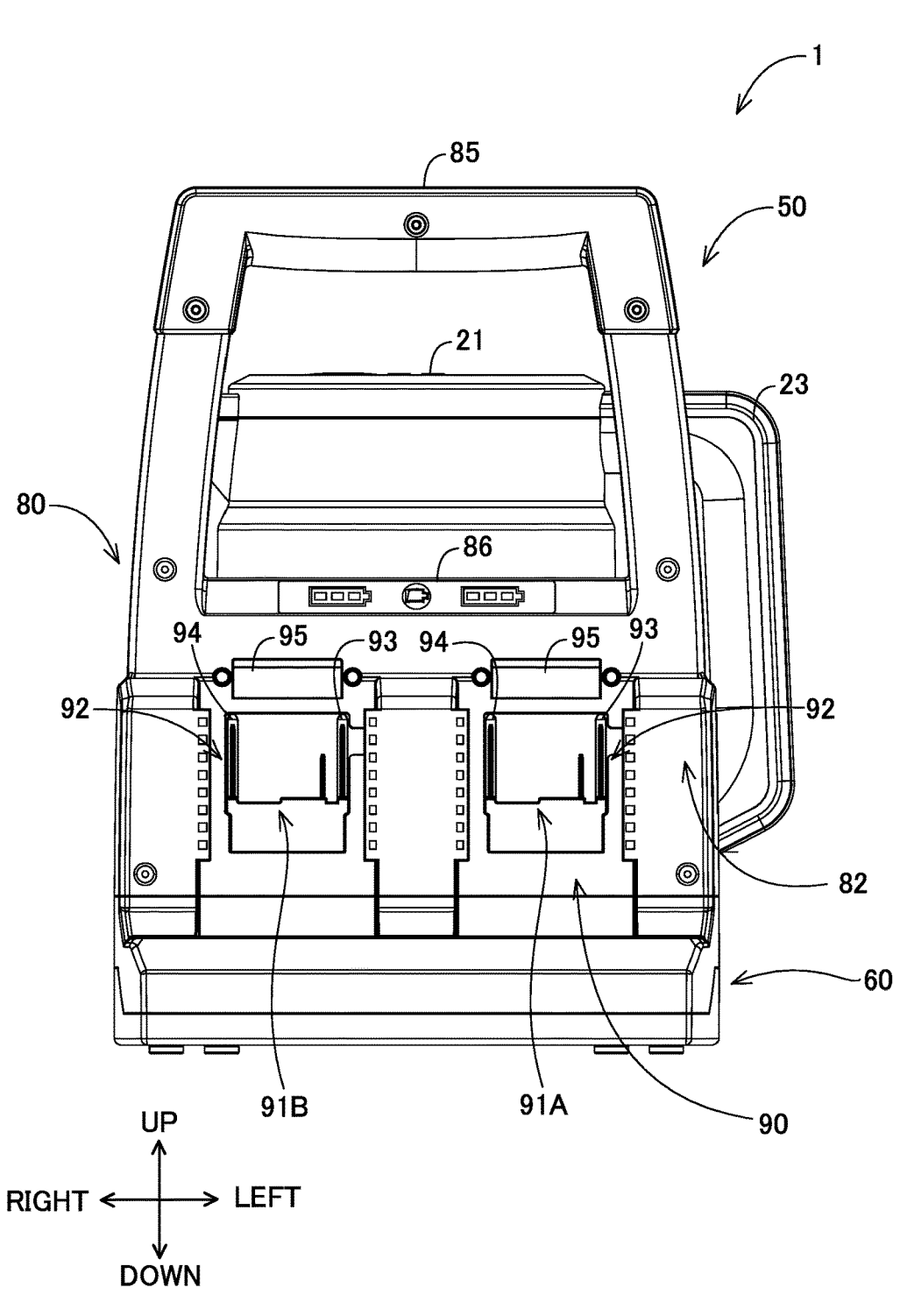

【FIG.16】
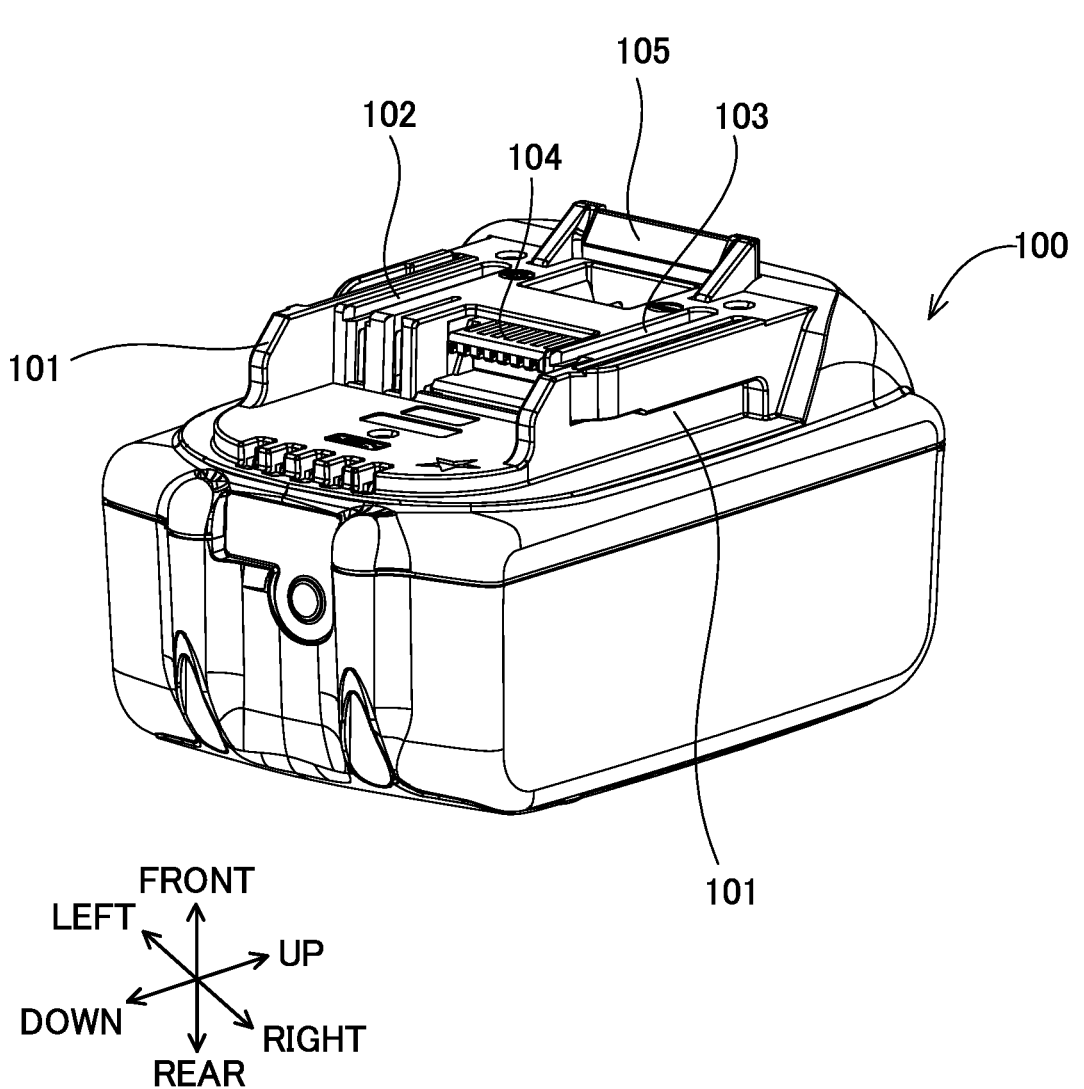

【FIG.17】
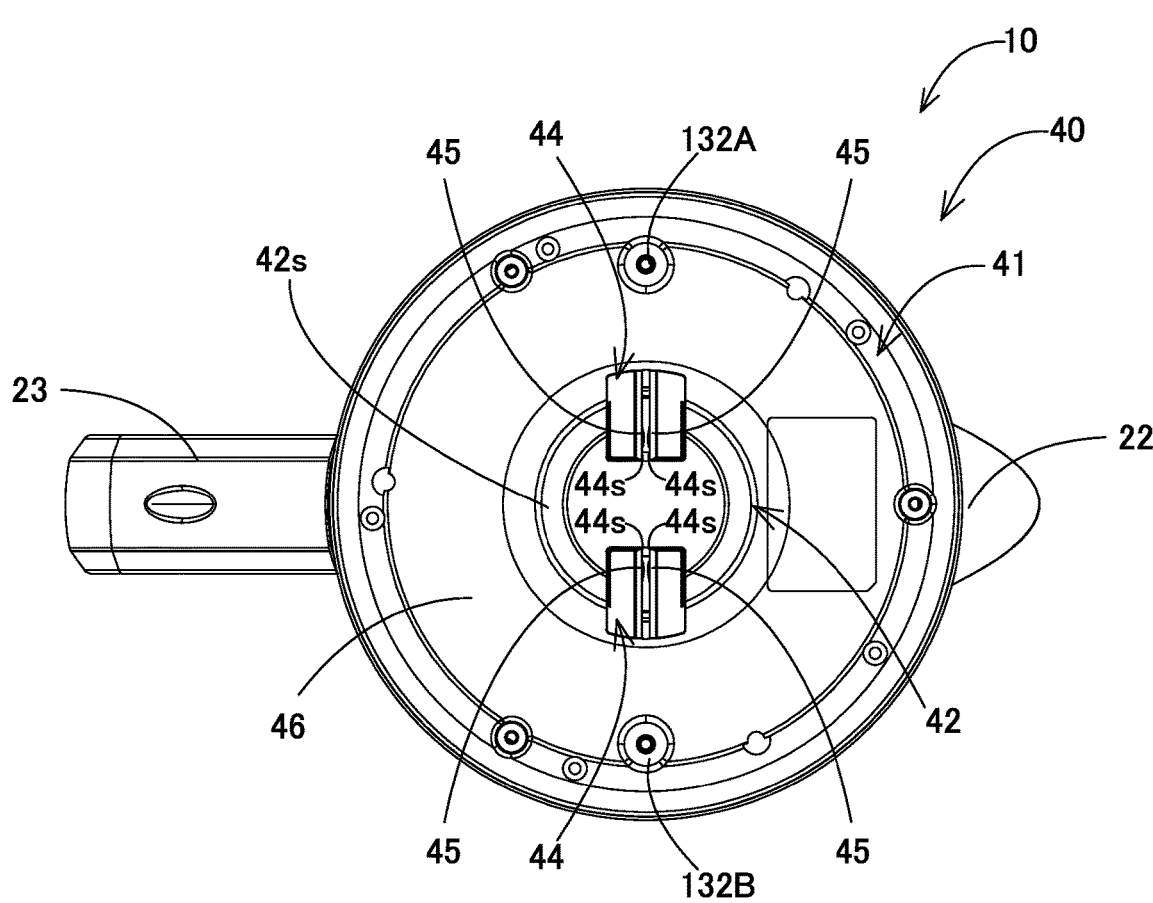
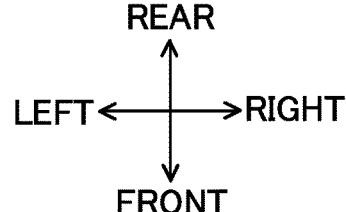

[FIG.18]
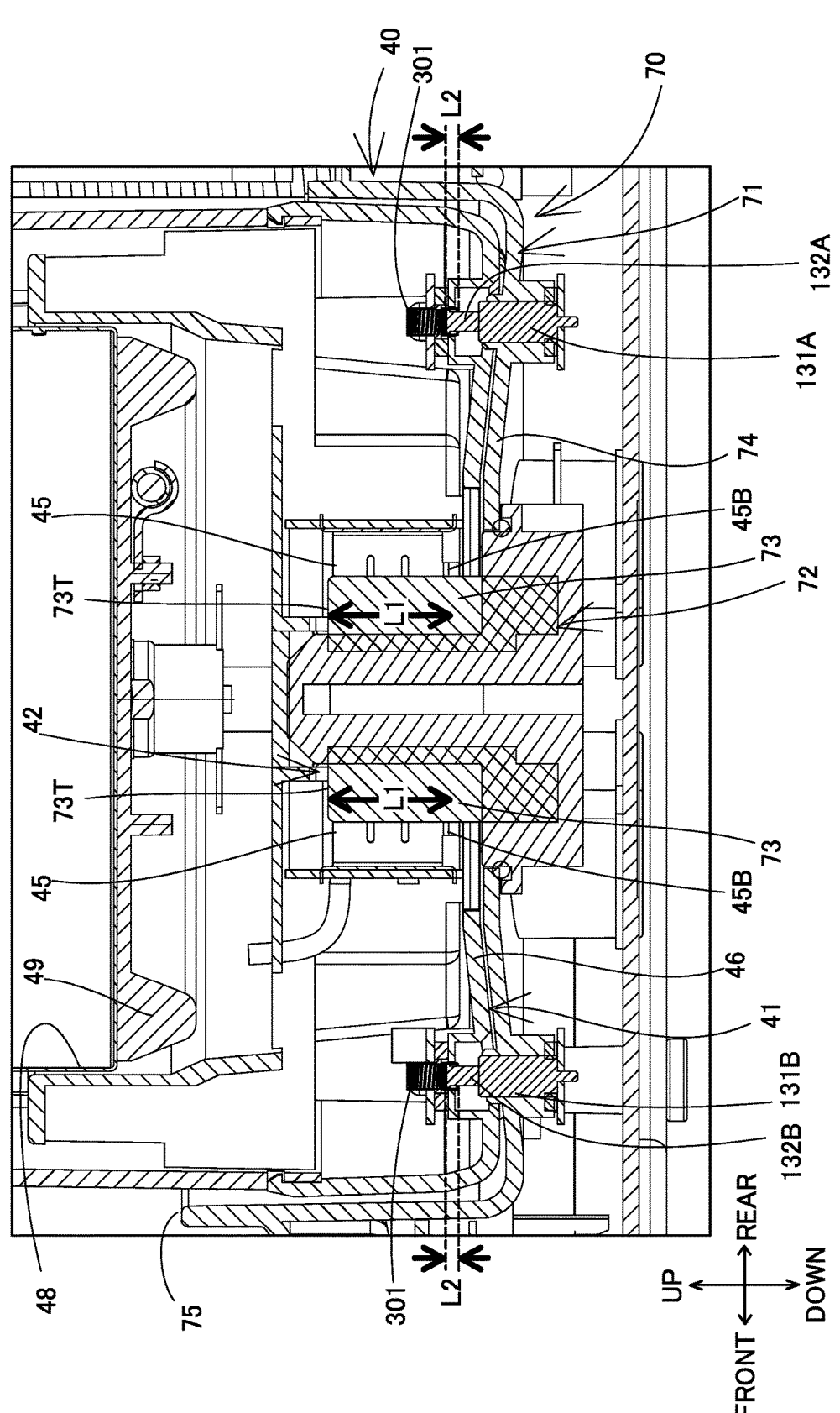

【FIG.19】

1

```
┌─────────────────────────────────────────────────────────────────┐
│                                                                   │
│   ┌──────────────────────────────────────────────────────┐ 50    │
│   │                                                  ┌──────────┐ 130
│   │                                                  │131A│132A│ │ Tc
│   │        65                                        │────┼────│ ┌──────────────┐
│   │   ┌──────────────┐◄╌╌╌╌╌╌╌╌╌╌╌╌╌╌╌╌╌╌╌╌╌╌╌╌╌╌╌╌│131B│132B│◄│TEMPERATURE   │
│   │   │         66   │                               └──────────┘ │SENSOR        │
│   │   │  ┌────────┐  │            133               └──────────────┘
│   │   │  │CONTROL │  │       ┌──────────┐                        │
│   │   │  │ PART   │  │◄╌╌╌╌╌╌│ BOTTOM   │                        │
│   │   │  └────────┘  │       │ SWITCH   │                  49    │
│   │   │              │       └──────────┘          ┌──────────┐  │
│   │   │              │                    72 42 ╌╌►│  HEATER  │  │
│   │   │              │                              └──────────┘  │
│   │   │              │            141                            │
│   │   │              │       ┌──────────┐                        │
│   │   │              │╌╌╌╌╌╌►│SOUND     │                        │
│   │   │     200      │       │OUTPUT PART│                       │
│   │   │  ┌────────┐  │        67                                 │
│   │   │  │SWTCHING│  │       ┌──────────┐                        │
│   │   │  │ PART   │  │◄╌╌╌╌╌╌│TEMPERATURE│                       │
│   │   │  └────────┘  │       │SETTING PART│                      │
│   │   │              │            86                             │
│   │   │              │       ┌──────────┐                        │
│   │   │              │╌╌╌╌╌╌►│DISPLAY PART│                      │
│   │   │              │       └──────────┘     S1                 │
│   │   │              │       ┌──────────┐                        │
│   │   │              │╌╌╌╌╌╌►│MAIN SWITCH│                       │
│   │   └──────────────┘       └──────────┘                        │
│   │    ▲   ▲   ▲    91A        91B                               │
│   │   ┌──────────┐  ┌──────────┐                                 │
│   │   │MOUTING   │  │MOUTING   │                                 │
│   │   │PART      │  │PART      │                                 │
│   │   └──────────┘  └──────────┘                                 │
│   │         ▲             ▲                                      │
│   └─────────┼─────────────┼──────────────────────────────────────┘
│             ╌             ╌                                      │
└─────────────┼─────────────┼──────────────────────────────────────┘
          100A          100B
      ┌──────────┐  ┌──────────┐
      │  BAT1    │  │  BAT2    │
      └──────────┘  └──────────┘
```

[FIG.20]
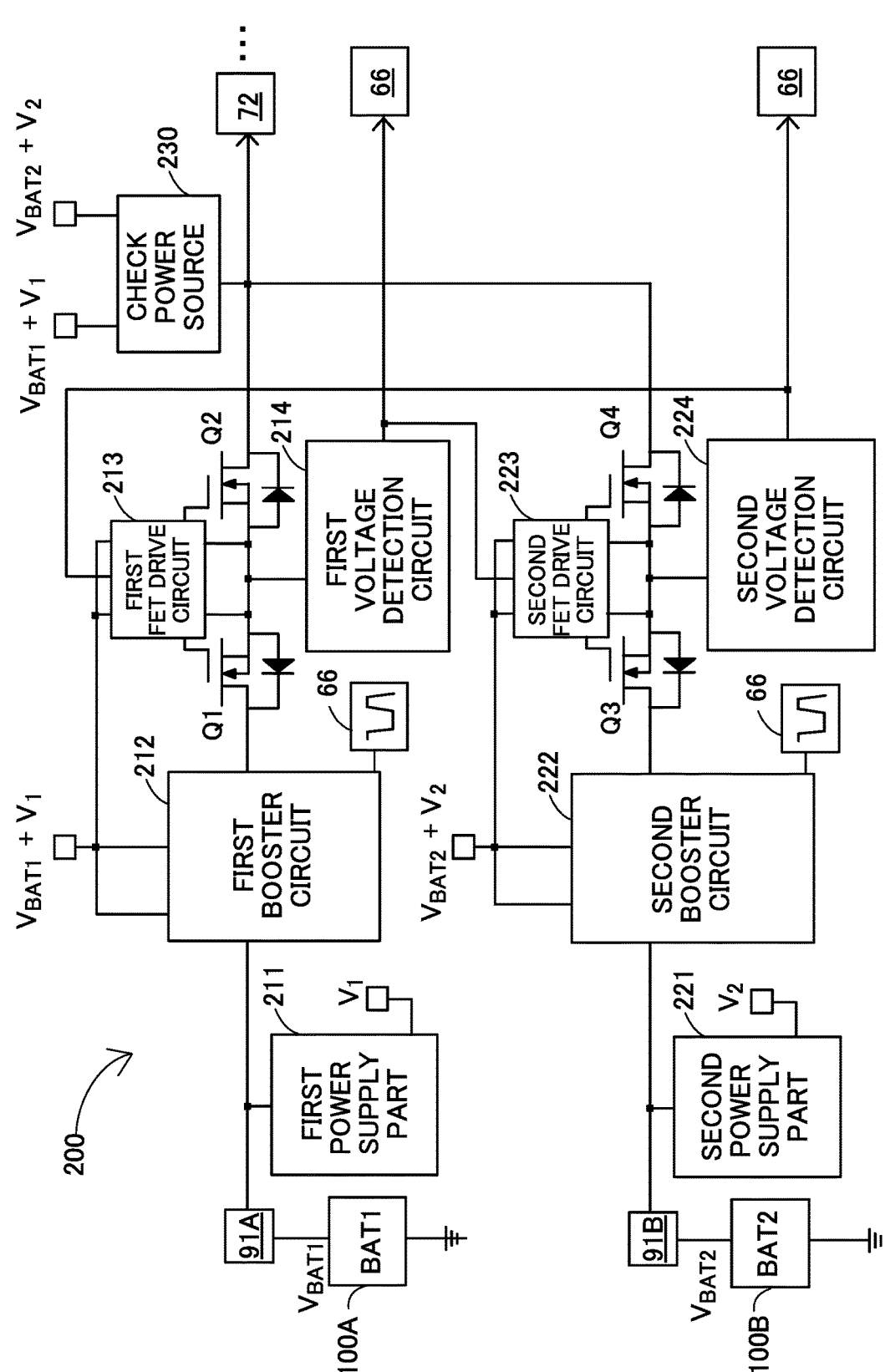

[FIG.21]
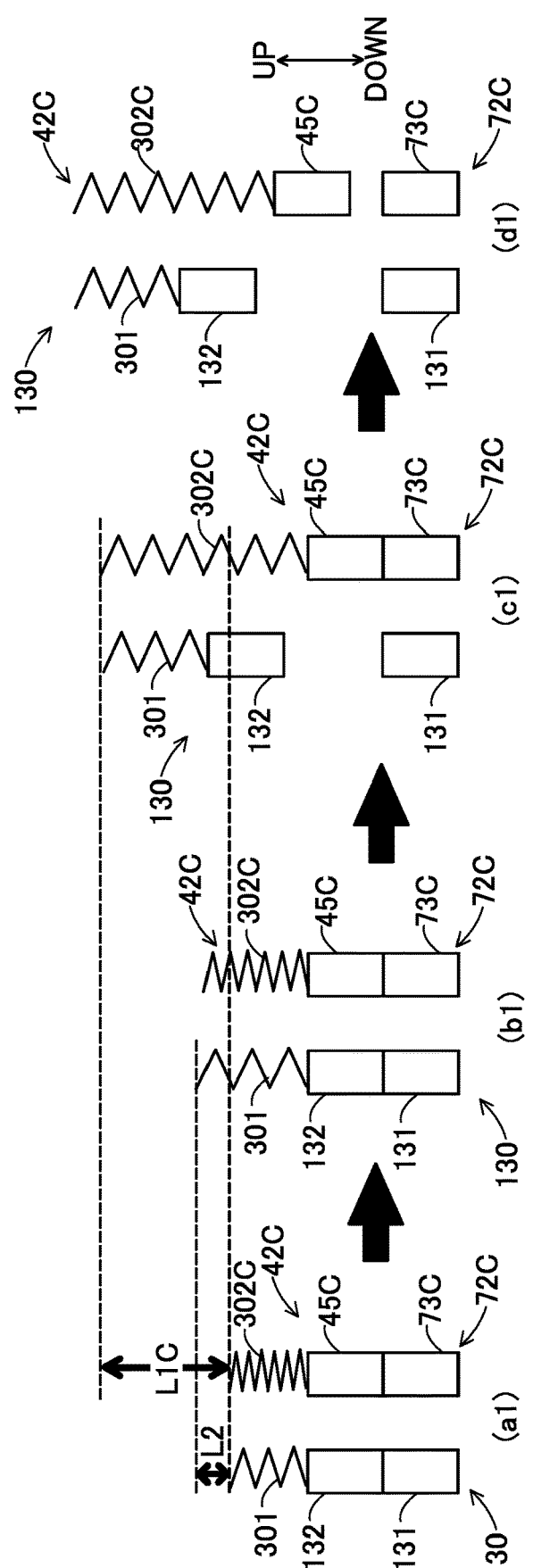

[FIG.22]
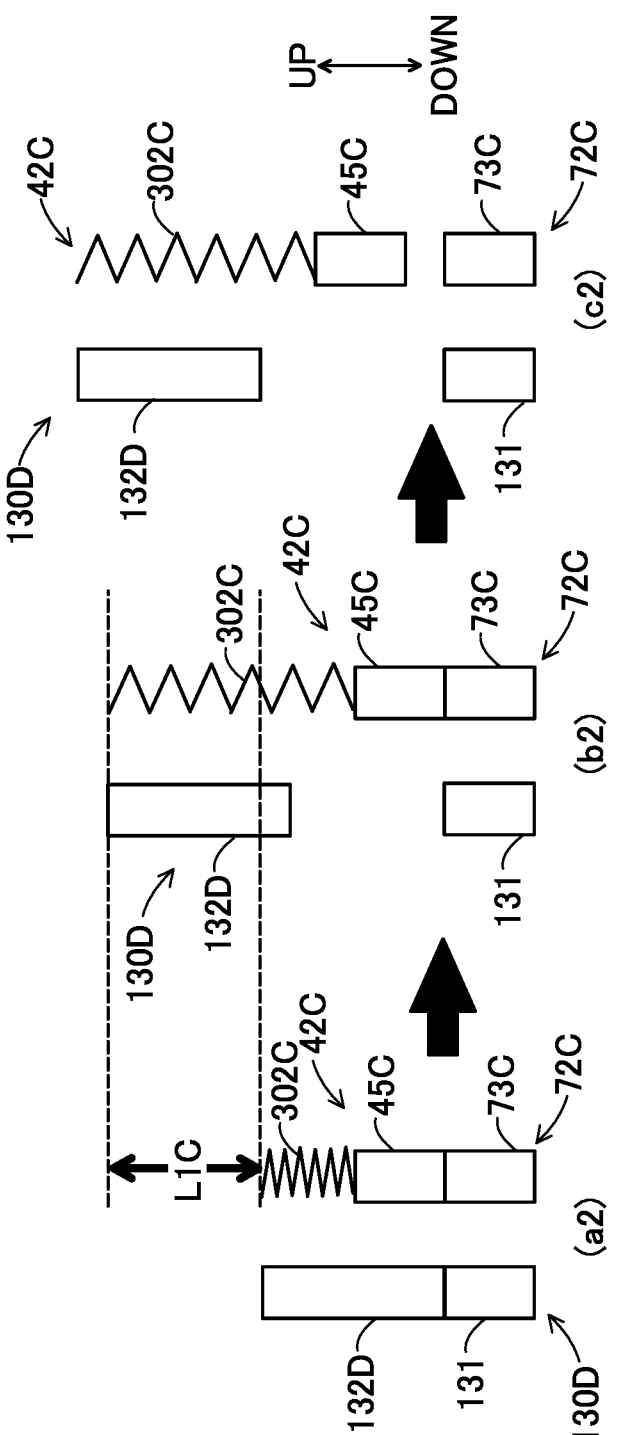

ELECTRIC KETTLE

CROSS REFERENCE TO RELATED ART

The present application claims priority to Japanese Patent Application No. 2020-199410 filed on Dec. 1, 2020 and Japanese Patent Application No. 2021-134628 filed on Aug. 20, 2021, the disclosure of which is hereby incorporated by reference in its entirety.

TECHNICAL FIELD

The present disclosure relates to an electric kettle including a kettle body and a power supply unit.

BACKGROUND

Electric kettles for boiling water in a container with a heating device provided in the container are known. WO 2018/074355 discloses an electric kettle that includes a pot body having a heat source incorporated therein and a disc-shaped receiving base for the pot body. The receiving base is connected to a battery pack provided as an external power source via a power cord. Power of the battery pack is supplied to the heat source of the pot body via the receiving base.

SUMMARY

There is a desire to further improve the durability of an electric kettle of such a type that power of a battery pack is supplied to a pot body via a receiving base.

According to a first aspect of the present disclosure, an electric kettle is provided. The electric kettle has a kettle body, a power supply unit and a detection part. The kettle body has a power receiving connection part and a heating part. The power receiving connection part is configured to receive power from an external power source. The heating part is configured to heat liquid contained in the kettle body by the power the power receiving connection part receives. The power supply unit is configured such that the kettle body is placed thereon, and is configured to supply power to the kettle body. The power supply unit has a power supply base including a power supply connection part, and a mounting unit. The power supply connection part is configured to be removable from the power receiving connection part and to be electrically connected to the power receiving connection part. The power supply base is configured such that the kettle body is placed on top thereof. The mounting unit is configured such that a battery pack is removably coupled thereto as the external power source for supplying power to the heating part via the power supply connection part and the power receiving connection part. The detection part is configured to detect whether the power supply unit is on the power supply base. The electric kettle is configured to supply power to the heating part via the power supply connection part and the power receiving connection part when the detection part detects that the kettle body is on the power supply base. The electric kettle is further configured to stop power supply to the heating part via the power supply connection part and the power receiving connection part when the detection part detects that the kettle body is not on the power supply base. The power supply connection part and the power receiving connection part are configured such that the power supply connection part and the power receiving connection part are disconnected after the detection part detects that the kettle body is not on the power supply base.

According to this aspect, the electric kettle is configured such that the power supply connection part and the power receiving connection part are disconnected after the detection part detects that the kettle body is not on the power supply base (that is, after the electric kettle stops power supply to the heating part via the power supply connection part and the power receiving connection part), so that the possibility of generation of arc discharge (occurrence of arc discharge, generation of spark) between the power supply connection part and the power receiving connection part can be reduced. Accordingly, the durability of the electric kettle can be improved.

BRIEF DESCRIPTION OF THE DRAWINGS

FIG. 1 is a perspective view of an electric kettle with a battery pack mounted thereon.

FIG. 2 is a perspective view of the electric kettle with a kettle body removed from a power supply unit.

FIG. 3 is an enlarged perspective view of a power supply connection part.

FIG. 4 is a front view of the electric kettle with the battery pack mounted thereon.

FIG. 5 is a right side view of the electric kettle with the battery pack mounted thereon.

FIG. 6 is a left side view of the electric kettle with the battery pack mounted thereon.

FIG. 7 is a top view of the electric kettle with the battery pack mounted thereon.

FIG. 8 is a back view of the electric kettle with the battery pack mounted thereon.

FIG. 9 is a sectional view of the electric kettle, taken along line IX-IX in FIG. 5.

FIG. 10 is a sectional view of the electric kettle, taken along line X-X in FIG. 4.

FIG. 11 is a top view of the power supply unit with the battery pack mounted thereon.

FIG. 12 is a bottom view of the power supply unit with the battery pack mounted thereon.

FIG. 13 is a sectional view taken along line XIII-XIII in FIG. 12.

FIG. 14 is a top view of the electric kettle.

FIG. 15 is a back view of the electric kettle.

FIG. 16 shows an example of the battery pack.

FIG. 17 is a bottom view of the kettle body.

FIG. 18 is a partial, enlarged sectional view of the electric kettle, showing connection between a power supply connection part and a power receiving connection part and connection between first energizing terminals and second energizing terminals.

FIG. 19 is a block diagram showing the structure of the electric kettle.

FIG. 20 is a circuit diagram for illustrating a switching part.

FIG. 21 is a schematic view for illustrating movement of the power supply connection part, the power receiving connection part and the detection part from the state where the kettle body is on the power supply base to the state where the power supply connection part and the power receiving connection part are disconnected, in a second embodiment.

FIG. 22 is a schematic view for illustrating movement of the power supply connection part, the power receiving connection part and the detection part from the state where the kettle body is on the power supply base to the state where the power supply connection part and the power receiving connection part are disconnected, in a third embodiment.

DETAILED DESCRIPTION OF THE EMBODIMENTS

Representative, non-limiting examples of the present disclosure are described below in detail with reference to the attached drawings. This detailed description is merely intended to teach a person skilled in the art further details for practicing preferred aspects of the present teachings and is not intended to limit the scope of the disclosure. Furthermore, each of the additional features and teachings disclosed below may be utilized separately or in conjunction with other features and teachings to provide improved electric kettles and usage thereof.

Moreover, combinations of features and steps disclosed below in the detailed description may not be necessary to practice the disclosure in the broadest sense, and are instead taught merely to particularly describe representative examples of the disclosure. Furthermore, various features of the representative examples described above and below, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups or entities are intended to disclose every possible intermediate value or intermediate entity for the purpose of original written disclosure, as well as for the purpose of restricting the claimed subject matter.

In one, non-limiting embodiment of the present disclosure, the detection part may include a first detection part and a second detection part. The first detection part may be provided at a different position from the power supply connection part on the power supply base, and the second detection part may be provided at a different position from the power receiving connection part on the kettle body. The detection part may be configured to detect that the kettle body is on the power supply base when the first detection part and the second detection part are in contact with each other, and to detect that the kettle body is not on the power supply base when the first detection part and the second detection part are not in contact with each other.

With the above-described structure, the durability of the electric kettle can be improved in the structure of detecting whether the kettle body is on the power supply base depending on whether the first and second detection parts are in contact with each other.

In addition or in the alternative to the preceding embodiment of the present disclosure, the first detection part and the second detection part may have conductivity. The detection part may be configured to detect that the kettle body is on the power supply base when current is carried between the first detection part and the second detection part. The detection part may be configured to detect that the kettle body is not on the power supply base when current is not carried between the first detection part and the second detection part.

With the above-described structure, whether the kettle body is on the power supply base can be detected depending on whether current is carried between the first and second detection parts.

In addition or in the alternative to the preceding embodiments of the present disclosure, the first detection part may include a third detection part and a fourth detection part. The second detection part may include a fifth detection part and a sixth detection part. The detection part may be configured to detect that the kettle body is on the power supply base when a placing condition that the third detection part and the fourth detection are respectively in contact with the fifth detection part and the sixth detection part is satisfied. The detection part may be configured to detect that the kettle body is not on the power supply base when the placing condition is not satisfied.

With the above-described structure, whether the kettle body is on the power supply base can be detected more accurately as compared with a structure in which contact between the kettle body and the power supply base is detected depending on the presence of contact between one pair of detection parts (the presence of contact only either between the third and fifth detection parts or between the fourth and sixth detection parts).

In addition or in the alternative to the preceding embodiments of the present disclosure, the power supply connection part may be provided on a central portion of an upper surface of the power supply base, and the third detection part and the fourth detection part may be arranged symmetrically to the power supply connection part. The power receiving connection part may be provided on a central portion of a lower surface of the kettle body, and the fifth detection part and the sixth detection part may be arranged symmetrically to the power receiving connection part.

With the above-described structure, when the kettle body is tilted relative to the power supply base, at least either contact between the third and fifth detection parts or contact between the fourth and sixth detection parts is disconnected (that is, the placing condition is not satisfied). Therefore, whether the kettle body is on the power supply base can be furthermore accurately detected.

In addition or in the alternative to the preceding embodiments of the present disclosure, the kettle body may have a liquid containing part for storing liquid. The detection part may further include a temperature sensor configured to measure a temperature of the liquid in the liquid containing part. The detection part may be configured to measure the temperature of the liquid in the liquid containing part with the temperature sensor when current is carried between the third detection part and the fifth detection part and between the fourth detection and the sixth detection part.

With the above-described structure, the detection part can perform a function of detecting whether the kettle body is on the power supply base and a function of measuring the liquid temperature in the liquid containing part. Therefore, the structure of the electric kettle can be simplified as compared with a structure in which a circuit for the temperature sensor is provided separately from the detection part.

In addition or in the alternative to the preceding embodiments of the present disclosure, the detection part may include a first spring that is expandable and compressible (deflectable) in an up-down direction. The first spring may be provided on at least one of the first and second detection parts. The first spring may have such a stroke length (a deflection length, a spring travel) in the up-down direction that the power supply connection part and the power receiving connection part are disconnected after the detection part detects that the kettle body is not on the power supply base when the kettle body placed on the power supply base is moved upward.

With the above-described structure, provision of the first spring that is expandable and compressible (deflectable) in the up-down direction can ensure contact between the first and second detection parts even if at least one of the first and second detection parts has a dimensional error in the up-down direction (in manufacturing). For example, the electric kettle may be configured such that the first and second detection parts are held in contact with each other until the upward moving distance (the distance of upward travel) of the kettle body exceeds the stroke length of the first spring, and such that the power supply connection part and the power receiving connection part are disconnected after the detection part detects that the kettle body is not on the power supply base (that is, after the electric kettle stops power supply to the heating part via the power supply connection part and the power receiving connection part).

In addition or in the alternative to the preceding embodiments of the present disclosure, the first spring may be provided on the second detection part.

With the above-described structure, in which the first spring is provided on the second detection part formed on the kettle body, even if liquid spills from the kettle body, the liquid does not easily adhere to the first spring. Thus, the possibility that the first spring is deteriorated due to adherence of liquid can be reduced, so that the durability of the detection part can be improved.

In addition or in the alternative to the preceding embodiments of the present disclosure, at least one of the power supply connection part and the power receiving connection part may include a second spring that is expandable and compressible in an up-down direction. The second spring may have such a stroke length (a deflection length, a spring travel) in the up-down direction that the power supply connection part and the power receiving connection part are disconnected after the detection part detects that the kettle body is not on the power supply base when the kettle body placed on the power supply base is moved upward.

With the above-described structure, provision of the second spring that is expandable and compressible in the up-down direction can ensure contact between the power supply connection part and the power receiving connection part even if at least one of the power supply connection part and the power receiving connection part has a dimensional error in the up-down direction.

In addition or in the alternative to the preceding embodiments of the present disclosure, the power supply connection part may have a power supply connection terminal. The power receiving connection part may have a power receiving connection terminal. The power supply connection terminal and the power receiving connection terminal may be configured such that one of the power supply connection terminal and the power receiving connection terminal sandwich the other and to be electrically connected to each other.

With the above-described structure, the area of contact between the power supply connection terminal and the power receiving connection terminal can be increased, so that power supply from the power supply connection part to the power receiving connection part can be further stabilized.

In addition or in the alternative to the preceding embodiments of the present disclosure, the first detection part may be provided on an upper surface of the power supply base. The power supply connection terminal may be provided on the upper surface of the power supply base so as to protrude upward from the upper surface, and may extend in an up-down direction such that an upper end of the power supply connection terminal is located above an upper end of the first detection part.

With the above-described structure, the power supply connection terminal extends in the up-down direction and the upper end of the power supply connection terminal is located above the upper end of the first detection part. Thus, when the kettle body is moved upward from the power supply base, the power receiving connection terminal can be separated from the upper end of the power supply connection terminal after the second detection part is separated from the upper end of the first detection part.

First Embodiment

<Structure of the Electric Kettle>

An electric kettle 1 according to a first embodiment of the present disclosure is described with reference to FIGS. 1 to 20. The electric kettle 1 includes a kettle body 10 and a power supply unit 50. A user of the electric kettle 1 places the kettle body 10 containing liquid such as water, on a power supply base 70 of the power supply unit 5 having an external power source coupled thereto and turns on a switch S1 that is provided in the power supply unit 50 in order to boil liquid in the kettle body 10. Battery packs 100A and 100B are mounted on the electric kettle 1 shown in FIGS. 1 and 4 to 8 and the power supply unit 50 shown in FIG. 11. The battery packs 100A, 100B are an example of the external power source of the electric kettle 1.

In the following description, for convenience sake, the up-down direction of the electric kettle 1 is defined with reference to the attitude of the kettle body 10 of the electric kettle 1 placed on the power supply unit 50. Specifically, the side on which the kettle body 10 is placed on the power supply unit 50 is an upper side of the electric kettle 1, while the opposite side is a lower side of the electric kettle 1. Further, an extension direction of an axis that is orthogonal to the up-down direction and that intersects the kettle body 10 and a mounting unit 90 for mounting the battery packs 100A, 100B is defined as a front-rear direction. In the front-rear direction, the side on which the mounting unit 90 is arranged on the power supply unit 50 is defined as a rear side, while the side on which the kettle body 10 is arranged is defined as a front side. A direction orthogonal to the up-down direction and the front-rear direction is defined as a left-right direction.

<Structure of the Power Supply Unit>

The power supply unit 50 is configured such that the kettle body 10 is placed thereon, and configured to supply power to the kettle body 10 placed thereon. In this embodiment, the power supply unit 50 mainly includes a base part 60, a wall part 80 and the mounting unit 90. The power supply unit 50 can be formed of metal or resin (polymer). The wall part 80 is a generally plate-like member extending upward from the base part 60.

As shown in FIG. 2, the base part 60 is a generally plate-like member extending in the front-rear direction and the left-right direction. A lower surface 63 of the base part 60 can be placed on a table (or a desk), floor or ground.

The power supply base 70 is provided in a region of the base part 60 on a front surface 81 side of the wall part 80. The power supply base 70 is configured such that a bottom part 40 of the kettle body 10 is placed thereon. Specifically, the bottom part 40 (a lower surface 41) of the kettle body 10 is placed on an upper surface 71 of the power supply base 70. In this embodiment, the upper surface 71 of the power supply base 70 is located below an upper end of a side wall 62 of the base part 60. The area of the power supply base 70 is slightly larger than the area of the bottom part 40 of the kettle body 10.

As shown in FIG. 11, a power supply connection part 72 and a pair of terminals (first energizing terminals 131A, 131B) are provided in the upper surface 71 of the power supply base 70. The power supply connection part 72 is provided substantially on a central portion of the upper surface 71. The first energizing terminals 131A, 131B are arranged substantially symmetrically to the power supply connection part 72. The power supply connection part 72 and the first energizing terminals 131A, 131B will be described in further detail below.

As shown in FIGS. 2, 11 and 12, the power supply base 70 has through holes 77 formed through the power supply base 70 in the up-down direction. In this embodiment, the through holes 77 are closer to an outer edge of the power supply base 70, i.e., closer to the outer edge of the power supply base 70 in the radial direction, than to the power supply connection part 72. It can also be said that the through holes 77 are closer to the side wall 62 of the base part 60 and the wall part 80. In this embodiment, four such through holes 77 are provided and arranged substantially symmetrically to the power supply connection part 72. As shown in FIGS. 9 and 10, the upper surface 71 of the power supply base 70 has an inclined surface 74 inclined downward from the power supply connection part 72 toward the outside (outer edge) of the power supply base 70.

As shown in FIGS. 12 and 13, a bottom switch 133 is provided in the lower surface 63 of the power supply unit 50. The lower surface 63 of the power supply unit 50 shown in FIG. 13 is not placed (situated, located) on a plane (flat surface). The plane (flat surface) refers to, for example, an at least substantially flat (even) surface (e.g., the top surface of a desk, a floor surface, or a ground surface). The bottom switch 133 is of a push-in type. In this embodiment, the bottom switch 133 includes a button 134 and a button receiver 135. The button 134 and the button receiver 135 are configured to be movable in the up-down direction. The button 134 protrudes downward from the lower surface 63 of the base part 60 while the lower surface 63 is not on a plane. The button receiver 135 is arranged above the button 134 to face the button 134. The button receiver 135 is configured to be pushed upward by the button 134 when the lower surface 63 of the power supply unit 50 is placed (put, mounted) on a plane and the button 134 is pushed in upward. The button receiver 135 is configured to transmit an ON signal to a control part 66 (described below) when a lower surface of the button 134 is substantially flush with the lower surface 63 of the base part 60. When the lower surface 63 of the power supply unit 50 is moved away from the plane, the button 134 and the button receiver 135 move downward. As a result, the ON signal from the button receiver 135 to the control part 66 is cut off (in other words, the bottom switch 133 is turned off). Specifically, the bottom switch 133 is configured to be pushed into the lower surface 63 of the base part 60 so as not to protrude downward from the lower surface 63 of the base part 60 when the lower surface 63 of the base part 60 is on a plane. The bottom switch 133 has a function of detecting whether the power supply unit 50 is on a plane (flat surface) (or whether the power supply unit 50 is being situated/located on a plane).

As shown in FIGS. 1, 2 and 4 to 7, a rib 75 is formed in front of the power supply base 70 and protrudes upward from the power supply base 70. The rib 75 is formed in a position to face the front surface 81 of the wall part 80. The rib 75 is shaped to conform to the outer edge of the power supply base 70 and an outer peripheral surface 31 of the kettle boy 10. The rib 75 restricts forward movement of the kettle boy 10 placed on the power supply base 70. In this embodiment, an upper end of the rib 75 in the up-down direction is located above a lower end of a kettle grip part 23 of the kettle body 10 placed on the power supply base 70.

The wall part 80 is now described. In this embodiment, the wall part 80 is a generally plate-like member extending in the up-down direction and the left-right direction. The wall part 80 extends upward from the power supply base 70. The power supply base 70 is provided in a region on the front surface 81 side of the wall part 80, and the mounting unit 90 is provided in a region on a rear surface 82 side of the wall part 80. In this embodiment, the wall part 80 separates the region for the power supply base 70 and the region for the mounting unit 90.

The wall part 80 has a power supply unit grip part 85 that is arranged above the mounting unit 90 and configured to be held (gripped, grasped) by the user. The power supply unit grip part 85 is shaped with a through hole extending through the wall part 80 in the front-rear direction. It can also be said that the power supply unit grip part 85 is provided between the mounting unit 90 and the kettle body 10 placed on the power supply base 70 in the front-rear direction. An upper end of the power supply unit grip part 85 protrudes above the kettle body 10 on the power supply base 70. In this embodiment, the electric kettle 1 is configured such that the center of gravity of the electric kettle 1 is located on or near the wall part 80 irrespective of the amount of liquid in the kettle body 10 when the battery packs 100A, 100B are mounted on the mounting unit 90 and the kettle body 10 is on the power supply base 70. Thus, the power supply unit grip part 85 is arranged directly above the center of gravity of the electric kettle 1.

As shown in FIGS. 2 and 11, the wall part 80 has a recessed part 83 formed in the front surface 81 and recessed rearward. The recessed part 83 is shaped to conform to the outer peripheral surface 31 of the kettle body 10 placed on the power supply base 70.

As shown in FIGS. 8 and 15, a display part 86 is provided on the rear surface 82 of the wall part 80. In this embodiment, drive information of the electric kettle 1 such as the residual capacity of the battery packs 100A, 100B is displayed on the display part 86.

The battery packs 100A, 100B to be mounted on the mounting unit 90 and the mounting unit 90 are now described with reference to FIGS. 14 to 16.

Each of the battery packs 100A, 100B is, for example, a DC power source having a nominal voltage of 36 volts and can be used as a power source of the electric kettle 1.

The battery pack 100A, 100B may also be called as a battery package or an assembled battery, and has an outer shell housing formed into a prescribed size and a plurality of lithium ion battery cells that are housed in the outer shell housing and connected in series. The battery pack 100A, 100B is a rechargeable battery pack and can be recharged by a charger (not shown) after used as an external power source. The battery pack 100A, 100B is a so-called slide-type battery pack and can be removably mounted on the mounting unit 90 or a charger. The battery packs 100A and 100B have the same structure.

In FIG. 16, the up-down direction, the front-rear direction and the left-right direction are shown with reference to the attitude of the battery pack 100A mounted on the mounting unit 90. The battery pack 100A, 100B has a pair of left and right rail receiving parts 101. A positive output terminal 102 and a negative output terminal 103 are arranged between the rail receiving parts 101. A connector part 104 is arranged between the positive output terminal 102 and the negative output terminal 103 and configured to transmit and receive control signals to and from a charger and other devices. A lock member 105 is provided on an upper part of the battery pack 100A, 100B. A spring member (not shown) is arranged below the lock member 105 within the housing of the battery pack 100A, 100B. The spring member biases the lock member 105 to press the lock member 105 upward. An unlock button 106 (see, for example, FIG. 11) is arranged on a rear surface of the battery pack 100A, 100B. When the unlock button 106 is pressed downward, the lock member 105 moves downward.

As shown in FIGS. 14 and 15, the mounting unit 90 is arranged on the rear surface 82 side of the wall part 80. In this embodiment, the mounting unit 90 is provided on a lower part of the rear surface 82 of the wall part 80. The mounting unit 90 has two mounting parts 91A and 91B having the same structure and electrically connected in parallel. The mounting unit 90 is configured to connect the battery packs 100A, 100B in parallel. The electric kettle 1 can be driven with power supplied from the mounting unit 90 having the two battery packs 100A, 100B mounted thereto.

Each of the mounting parts 91A, 91B has a pair of slide rails 92. In this embodiment, the slide rails 92 extend in the up-down direction. A positive input terminal 93 and a negative input terminal 94 are arranged on the slide rails 92. The mounting part 91A, 91B further has a lock receiving hole 95 that is engageable with the lock member 105 of the battery pack 100A, 100B.

The rail receiving parts 101 are engaged with the slide rails 92 and the battery pack 100A, 100B is mounted onto the mounting part 91A, 91B by sliding the battery pack 100A, 100B in a mounting direction relative to the mounting part 91A, 91B. In this embodiment, the mounting direction is from up to down. When the battery pack 100A, 100B is mounted onto the mounting part 91A, 91B, the positive input terminal 93 and the negative input terminal 94 of the mounting part 91A, 91B are electrically connected to the positive output terminal 102 and the negative output terminal 103 of the battery pack 100A, 100B. Further, when the battery pack 100A, 100B is mounted onto the mounting part 91A, 91B, the lock member 105 is engaged with the lock receiving hole 95 and the battery pack 100A, 100B is locked so as not to move in the up-down direction.

When a user presses down the unlock button 106 of the battery pack 100A, 100B mounted onto the mounting part 91A, 91B, the lock member 105 is disengaged (unlocked) from the lock receiving hole 95. When the battery pack 100A, 100B is slid in a removing direction relative to the mounting part 91A, 91B in the unlocked state, the battery pack 100A, 100B is removed from the mounting part 91A, 91B. In this embodiment, the removing direction is from down to up. Thus, the battery pack 100A, 100B can be removably mounted onto the mounting part 91A, 91B of the mounting unit 90.

<Structure of the Kettle Body>

As shown in FIGS. 1, 2 and 4 to 10, the kettle body 10 has appearance mainly having a body unit 20 and a lid 21. The body unit 20 has a bottomed hollow cylindrical shape having an open top. The lid 21 is connected to the body unit 20 and configured to open and close the open top of the body unit 20. The body unit 20 has a side wall part 30, a bottom part 40 and a liquid containing part 48.

The side wall part 30 is a generally hollow cylindrical part extending in the up-down direction of the body unit 20. The side wall part 30 forms the outer peripheral surface 31 of the kettle body 10. A spout 22 for pouring liquid from the liquid containing part 48 is formed in an upper end part of the side wall part 30. The kettle grip part 23 for holding the kettle body 10 is provided in a position opposed to the spout 22 when the kettle body 10 is viewed from above. Ends of the kettle grip part 23 are connected to upper and lower end parts of the side wall part 30. The side wall part 30 and the kettle grip part 23 can be formed of metal or resin.

The bottom part 40 is a part connected to the lower end of the side wall part 30. The bottom part 40 can be formed of metal or resin. As shown in FIG. 17, a power receiving connection part 42 and a pair of terminals (second energizing terminals 132A, 132B) are provided in the lower surface 41 of the bottom part 40. The power receiving connection part 42 is provided substantially on a central portion of the lower surface 41. The second energizing terminals 132A, 132B are arranged substantially symmetrically to the power receiving connection part 42. The power receiving connection part 42 and the second energizing terminals 132A, 132B will be described in further detail below.

As shown in FIGS. 9 and 10, the lower surface 41 of the bottom part 40 has an inclined face 46 inclined downward and radially outward from the power receiving connection part 42. The inclined face 46 is shaped to conform to the inclined surface 74 of the power supply base 70. Thus, the kettle body 10 is stably placed on the power supply base 70.

As shown in FIG. 9, the liquid containing part 48 is provided inside of the side wall part 30 and the bottom part 40. The liquid containing part 48 is shaped such that liquid such as water can be stored inside. An inner surface of the liquid containing part 48 may be coated with heat-resistant resin such as fluororesin. A bottom of the liquid containing part 48 is formed of heat conductive materials such as metal.

As shown in FIG. 10, a heater 49 is installed in the bottom part 40. The heater 49 receives power via the power receiving connection part 42 and heats liquid in the liquid containing part 48 (directly) above the bottom part 40.

<Structures of the Power Supply Connection Part, the Power Receiving Connection Part and the First and Second Energizing Terminals>

The structures of the power supply connection part 72, the power receiving connection part 42, the first energizing terminals 131A, 131B and the second energizing terminals 132A, 132B are now described mainly with reference to FIGS. 2, 3 and 18. The power supply connection part 72 and the first energizing terminals 131A, 131B are provided on the power supply base 70, while the power receiving connection part 42 and the second energizing terminals 132A, 132B are provided on the kettle body 10. The electric kettle 1 is configured such that, when the kettle body 10 on the power supply base 70, (i) the power supply connection part 72 is connected to the power receiving connection part 42, and (ii) the first energizing terminals 131A, 131B are respectively connected to the second energizing terminals 132A, 132B. Further, the electric kettle 1 is configured such that, when the kettle body 10 is removed (disengaged) from the power supply base 70, the power supply connection part 72 is disconnected from the power receiving connection part 42 (connection between the power supply connection part and the power receiving connection part is released) after the first energizing terminals 131A, 131B are respectively disconnected from the second energizing terminals 132A, 132B.

The detailed structures of the power supply connection part 72 and the power receiving connection part 42 are now described.

As shown in FIG. 2, the power supply connection part 72 is configured to protrude upward from the upper surface 71 of the power supply base 70. The power supply connection part 72 is configured such that the power receiving connection part 42 of the kettle body 10 is fitted thereon. As shown in FIG. 3, the power supply connection part 72 has a generally truncated conical shape having a bottom on the lower side and has a pair of notches 79 formed (recessed) from a side face 72s of the truncated conical part toward the center. A power supply connection terminal 73 that is a conductive member is provided in each of the notches 79. The power supply connection terminals 73 are substantially plate-like members parallel to each other in the front-rear direction. The power supply connection terminals 73 protrude upward from the upper surface 71 and extend in the up-down direction. In this embodiment, the power supply connection terminals 73 are arranged in parallel in the front-rear direction substantially in a center of the respective notches 79.

As shown in FIG. 3, each of the notches 79 has a pair of faces 79s that are parallel to each other in the front-rear direction and are connected to an outer peripheral surface (the side face 72s) of the truncated conical part, and a face 79c connecting the faces 79s. The faces 79s extend in the up-down direction and are opposed across the power supply connection terminal 73. An upper end of each of the faces 79s is located below an upper face 72u of the power supply connection part 72. The upper end of the face 79s is connected to the upper face 72u via an inclined face 79g. The inclined face 79g is inclined toward the power supply connection terminal 73. The inclined face 79g serves as a guide to move the kettle body 10 in the circumferential direction such that a power receiving connection terminal 45 of the kettle body 10 is connected to the power supply connection terminal 73, which will be described in detail below.

The side face 72s of the power supply connection part 72 is shaped to conform to a side face 42s (see FIG. 17) of the power receiving connection part 42 of the kettle body 10. Specifically, the power supply connection part 72 is configured such that the kettle body 10 can be moved in the circumferential direction while the side face 42s of the power receiving connection part 42 of the kettle body 10 can be moved along the side face 72s of the power supply connection part 72. Further, the power supply connection part 72 is configured to restrict rotation of the kettle body 10 when fitted in the power receiving connection part 42 of the kettle body 10. To restrict rotation herein means that the kettle body 10 is hardly movable in the circumferential direction when placed on the power supply base 70. Being hardly movable means that the kettle body 10 is movable only within a range in which the power receiving connection terminal 45 is held electrically connected to the power supply connection terminal 73. It can also be said that the power supply connection part 72 is configured such that the kettle body 10 cannot rotate when the power supply connection part 72 is fitted in the power receiving connection part 42 of the kettle body 10.

As shown in FIGS. 9 and 10, the power receiving connection part 42 is provided in an upward protruding part of the lower surface 41 of the kettle body 10. This part has a generally truncated conical shape having a lower base (bottom) on the lower side. As shown in FIG. 17, the power receiving connection part 42 has a pair of plate-like members 44 protruding from a side face of the truncated conical part toward the center. Each of the plate-like members 44 has a gap extending substantially in the up-down direction and configured such that the power supply connection terminal 73 can be inserted therein. The power receiving connection terminal 45 that is a conductive member is provided on each of a pair of faces 44s of the plate-like member 44 that define the gap. The power receiving connection terminals 45 are substantially plate-like members parallel to each other in the front-rear direction, and extend in the up-down direction from a position corresponding to the lower base to a position corresponding to an upper base of the truncated conical part. The power receiving connection terminals 45 are configured to come into contact with right and left side surfaces of the power supply connection terminal 73 inserted therebetween. In FIG. 18, the right power receiving connection terminal 45 in contact with the right side surface of the power supply connection terminal 73 is shown, but the left power receiving connection terminal 45 in contact with the left side surface is not shown. When the kettle body 10 is positioned relative to the power supply connection part 72 in the circumferential direction such that the plate-like members 44 are fitted in the notches 79 (see FIGS. 3 and 18), the power receiving connection terminals 45 come into contact with the power supply connection terminal 73, and movement of the kettle body 10 is restricted. In this state, power can be supplied from the battery packs 100A, 100B mounted on the mounting unit 90 to the kettle body 10 via the power supply connection terminals 73 and the power receiving connection terminals 45.

As described above, the power receiving connection terminals 45 are provided in a recessed part recessed upward from the lower surface 41 of the kettle body 10 and extend in the up-down direction. The power supply connection terminals 73 protrude upward from the upper surface 71 of the power supply base 70 and extend in the up-down direction. Further, the pair of the power receiving connection terminals 45 are configured such that the power supply connection terminal 73 is inserted and held therebetween. When the kettle body 10 is on the power supply base 70, each of the power receiving connection terminals 45 is in contact with the power supply connection terminal 73 over the range (distance, area) from a lower end 45B of the power receiving connection terminal 45 to an upper end 73T of the power supply connection terminal 73 in the up-down direction (see FIG. 18).

With such a structure, when the kettle body 10 is moved upward (lifted) from the position (see FIG. 18) placed on the power supply base 70, connection (contact) between the power supply connection terminal 73 and the power receiving connection terminal 45 is maintained until the lower end 45B of the power receiving connection terminal 45 is separated from the upper end 73T of the power supply connection terminal 73. Specifically, connection (contact) between the power supply connection terminal 73 and the power receiving connection terminal 45 is maintained until an upward moving distance or travel distance (hereinafter referred to as the moving distance Lm) of the kettle body 10 exceeds the distance (contact length L1, see FIG. 18) from the lower end 45B of the power receiving connection terminal 45 of the kettle body 10 placed on the power supply base 70 to the upper end 73T of the power supply connection terminal 73 in the up-down direction. In other words, the power receiving connection terminal 45 is disconnected from the power supply connection terminal 73 when the moving distance Lm exceeds the contact length L1 (the power receiving connection terminal 45 is away from the power supply connection terminal 73 when the moving distance Lm exceeds the contact length L1).

In this embodiment, as described above, each of the notches 79 of the power supply connection part 72 has the inclined face 79g inclined downward from the upper face 72u of the power supply connection part 72 toward the power supply connection terminal 73 (see FIG. 3). When the plate-like member 44 of the kettle body 10 is located on the inclined face 79g, the kettle body 10 moves downward along the inclined face 79g under its own weight and the plate-like member 44 is fitted in the notch 79. Thus, in the electric kettle 1 according to this embodiment, positioning of the kettle body 10 relative to the power supply unit 50 is completed when the plate-like member 44 is placed on the notch 79 or the inclined face 79g in the circumferential direction. Even if the plate-like member 44 is not placed on the inclined face 79g, a user can move the kettle body 10 in the circumferential direction to place the plate-like member 44 on the inclined face 79g. Thus, the kettle body 10 moves downward along the inclined face 79g under its own weight, so that the positioning of the kettle body 10 is completed.

Next, the detailed structures of the first energizing terminals 131A, 131B and the second energizing terminals 132A, 132B are described.

As shown in FIGS. 10, 11 and 18, the first energizing terminals 131A, 131B are provided substantially symmetrically to the power supply connection part 72 in the upper surface 71 of the power supply base 70. Upper ends of the first energizing terminals 131A, 131B slightly protrude from the upper surface 71 of the power supply base 70 in the up-down direction. The upper ends of the first energizing terminals 131A, 131B are located below the upper end 73T of the power supply connection terminal 73 (see FIG. 18). The second energizing terminals 132A, 132B are provided substantially symmetrically to the power receiving connection part 42 in the lower surface 41 of the kettle body 10 (see FIG. 17). In this embodiment, although not shown in detail, when the kettle body 10 is not on the power supply base 70, lower ends of the second energizing terminals 132A, 132B are located substantially in the same position as the lower surface 41 of the kettle body 10 in the up-down direction. In other embodiments, the upper ends of the first energizing terminals 131A, 131B need not necessarily protrude from the upper surface 71 of the power supply base 70. The lower ends of the second energizing terminals 132A, 132B may protrude from the lower surface 41 of the kettle body 10.

The first energizing terminals 131A, 131B and the second energizing terminals 132A, 132B are arranged to connect (come into contact) with each other when the kettle body 10 is placed on the power supply base 70 (when the power receiving connection part 42 and the power supply connection part 72 are fitted together), with the kettle grip part 23 either on the left side or on the right side. Specifically, the electric kettle 1 is configured such that, when the kettle body 10 is placed on the power supply base 70 with the kettle grip part 23 being located on the left side (See FIG. 1), the first energizing terminal 131A contacts with the second energizing terminal 132A, while the first energizing terminal 131B contacts with the second energizing terminal 132B (See FIG. 18). Further, the electric kettle 1 is configured such that, when the kettle body 10 is placed on the power supply base 70 with the kettle grip part 23 being located on the right side, the first energizing terminal 131A contacts with the second energizing terminal 132B, while the first energizing terminal 131B contacts with the second energizing terminal 132A. As shown in FIG. 9, in this embodiment, a temperature sensor Tc is provided on a bottom of the liquid containing part 48, and a circuit for the temperature sensor Tc is formed (activated, worked, completed, closed) when the first energizing terminals 131A, 131B respectively come into contact with the second energizing terminals 132A, 132B. Specifically, in the electric kettle 1, when the kettle body 10 is placed (put, mounted) on the power supply base 70, the first energizing terminals 131A, 131B respectively come into contact with the second energizing terminals 132A, 132B, and then the temperature of liquid in the liquid containing part 48 can be measured. Thus, the first energizing terminals 131A, 131B, the second energizing terminals 132A, 132B and the temperature sensor Tc also serve as a detection part for detecting whether the kettle body 10 is on the power supply unit 50 (hereinafter referred to as a detection part 130). The measurement result of the temperature sensor Tc is transmitted to the control part 66 described below. A current passing through the temperature sensor Tc is weak (small current or fine current).

Returning to the description of the second energizing terminals 132A, 132B, as shown in FIG. 18, a spring 301 is provided on each of the second energizing terminals 132A, 132B in this embodiment. In this embodiment, the spring 301 is a compression coil spring. The spring 301 is arranged on top of each of the second energizing terminals 132A, 132B and supported by the kettle body 10 so as to be expandable and compressible in the up-down direction. Accordingly, a lower end of each of the second energizing terminals 132A, 132B can be pushed upward by a stroke length (height) L2 (a deflection length (height), a deformation length (height), a spring travel) of the spring 301 (the change in length (height) of the spring 301 before and after movement (deflection, deformation) of the spring 301) in the up-down direction. When the kettle body 10 is placed (situated, located) on the power supply base 70, the second energizing terminals 132A, 132B are pushed upward by the first energizing terminals 131A, 131B. At this time, the springs 301 bias the second energizing terminals 132A, 132B against the first energizing terminals 131A, 131B, respectively. The stroke length L2 of the spring 301 is shorter than the contact length L1 between the power supply connection terminal 73 and the power receiving connection terminal 45 (see FIG. 18).

When the kettle body 10 is placed (situated, located) on the power supply base 70 and the lower surface 41 of the kettle body 10 comes into contact with the upper surface 71 of the power supply base 70, an upper end of the first energizing terminal 131A (131B) and a lower end of the second energizing terminal 132A (132B) come into contact with each other. At this time, the upper end of the first energizing terminal 131A (131B) pushes the lower end of the second energizing terminal 132A (132B) upward against the biasing force of the spring 301. When the kettle body 10 is moved upward (lifted) from the power supply base 70 (see FIG. 18), the first energizing terminal 131A (131B) and the second energizing terminal 132A (132B) are held in contact with each other until the spring 301 returns to its original length (free length, free height), which it a length of the spring 301 when no load is applied. Specifically, contact between the first energizing terminal 131A (131B) and the second energizing terminal 132A (132B) is maintained until the upward moving distance Lm of the kettle body 10 exceeds the stroke length L2 of the spring 301. In other words, the second energizing terminal 132A (132B) is disconnected from the first energizing terminal 131A (131B) when the upward moving distance Lm of the kettle body 10 exceeds the stroke length L2 of the spring 301. The stroke length L2 of the spring 301 corresponds to the length of continued (maintained) contact between the first energizing terminal 131A (131B) and the second energizing terminal 132A (132B) (in other words, the distance that the kettle body 10 travels while the contact between the first energizing terminal 131A (131B) and the second energizing terminal 132A (132B) is maintained). Therefore, the stroke length L2 can also be referred to as a contact length between the first energizing terminal 131A (131B) and the second energizing terminal 132A (132B) when the kettle body 10 is moved upward from the power supply base 70.

By provision of the above-described structures of the power supply connection part 72, the power receiving connection part 42, the first energizing terminals 131A, 131B and the second energizing terminals 132A, 132B, the first energizing terminals 131A, 131B and the second energizing terminals 132A, 132B are disconnected from each other in response to the upward moving distance Lm of the kettle body 10 exceeding the stroke length L2 of the spring 301 while the kettle body 10 is moving upward from the power supply base 70. Further, the power supply connection part 72 is disconnected from the power receiving connection part 42 (the power connection terminal 73 will no longer be in contact with the power receiving connection terminal 45) in response to the upward moving distance Lm of the kettle body 10 exceeding the contact length L1 between the power supply connection terminal 73 and the power receiving connection terminal 45 while the kettle body 10 is further moving upward.

<Power Supply Control in the Electric Kettle>

Power supply control in the electric kettle 1 is now described. As shown in FIG. 19, in this embodiment, the power supply unit 50 has a control device (control unit, control circuit, circuitry) 65. The control device 65 of this embodiment has the control part 66 and a switching part 200. The control device 65 is configured as a microcomputer having a CPU, a memory. The control device 65 (specifically, CPU) is configured to implement various functions to serve as control part 66, switching part 200. The control device 65 controls various operations of the electric kettle 1 using detection results of the above-described parts or components.

The control part 66 is configured to obtain a measurement result of the temperature sensor Tc when the circuit for the temperature sensor Tc is formed (activated, completed, closed) by contact between the first energizing terminals 131A, 131B and the second energizing terminals 132A, 132B. When the control part 66 obtains a measurement result of the temperature sensor Tc, it means that the kettle body 10 is on the power supply base 70. On the other hand, when the control part 66 does not obtain a measurement result of the temperature sensor Tc, it means that the kettle body 10 is not on the power supply base 70.

The control part 66 controls power supply to the heater 49 based on a measurement result of the temperature sensor Tc (i.e., a detection result of the detection part 130). In this embodiment, when the control part 66 can obtain a measurement result of the temperature sensor Tc, the control part 66 supplies power to the heater 49 via the power supply connection part 72 and the power receiving connection part 42. On the other hand, when the control part 66 cannot obtain a measurement result of the temperature sensor Tc, the control part 66 stops power supply to the heater 49. Therefore, in removal (lifting) of the kettle body 10 from the power supply base 70, power supply to the heater 49 via the power supply connection part 72 and the power receiving connection part 42 is stopped when (at substantially the same time that) the first energizing terminals 131A, 131B and the second energizing terminals 132A, 132B are disconnected (i.e., when the control part 66 cannot obtain a measurement result of the temperature sensor Tc).

As described above, in this embodiment, the electric kettle 1 is configured such that the power supply connection part 72 and the power receiving connection part 42 are disconnected from each other after the first energizing terminals 131A, 131B and the second energizing terminals 132A, 132B are disconnected from each other. Further, it is configured such that the stroke length L2 of the spring 301 provided on each of the second energizing terminals 132A, 132B is shorter than the contact length L1 between the power supply connection terminal 73 and the power receiving connection terminal 45. With such configuration, connection between the first energizing terminals 131A, 131B and the second energizing terminals 132A, 132B, connection between the power supply connection part 72 and the power receiving connection part 42, and power supply of the control part 66 change in the following order from (i) to (iii) when the kettle body 10 is removed (while the kettle body 10 is being moved upward) from the power supply base 70.

(i) When the upward moving distance Lm of the kettle body 10 is zero or more and not longer than the stroke length L2 of the spring 301 ($0 \leq Lm \leq L2$):

the power supply connection terminal 73 and the power receiving connection terminal 45 are in contact with each other; and the upper ends of the first energizing terminals 131A, 131B are in contact with the lower ends of the second energizing terminals 132A, 132B, so that the temperature sensor Tc can measure the liquid temperature. Thus, the control part 66 supplies power to the heater 49 via the power supply connection part 72 (the supply connection terminal 73) and the power receiving connection part 42 (the power receiving connection terminal 45).

(ii) When the upward moving distance Lm of the kettle body 10 is longer than the stroke length L2 of the spring 301 and not longer than the contact length L1 between the power supply connection terminal 73 and the power receiving connection terminal 45 ($L2 < Lm \leq L1$):

the lower ends of the second energizing terminals 132A, 132B are separated from the upper ends of the first energizing terminals 131A, 131B, so that the temperature sensor Tc cannot measure the liquid temperature. Thus, the control part 66 stops power supply to the heater 49 via the power supply connection part 72 and the power receiving connection part 42. The supply connection terminal 73 and the power receiving connection terminal 45 are held in contact with each other.

(iii) When the upward moving distance Lm of the kettle body 10 is longer than the contact length L1 between the power supply connection terminal 73 and the power receiving connection terminal 45 ($L1 < Lm$):

the power receiving connection terminal 45 is disconnected from the power supply connection terminal 73. Like in (ii) above, the lower ends of the second energizing terminals 132A, 132B are separate from the upper ends of the first energizing terminals 131A, 131B, so that the temperature sensor Tc cannot measure the liquid temperature. The control part 66 continues stopping power supply to the heater 49 via the power supply connection part 72 and the power receiving connection part 42.

With the above-described structure, in the electric kettle 1, in removal of the kettle body 10 from the power supply base 70, the first energizing terminals 131A, 131B and the second energizing terminals 132A, 132B are disconnected (i.e., the detection part 130 detects that the kettle body 10 is not on the power supply base 70) and thus power supply to the heater 49 via the power supply connection part 72 and the power receiving connection part 42 is stopped, and thereafter, connection between the power supply connection part 72 and the power receiving connection part 42 is released. In other words, power supply to the heater 49 is stopped before disconnection between the power supply connection part 72 and the power receiving connection part 42.

Returning to the description of the control part 66, the control part 66 is configured to indicate drive information of the electric kettle 1 to the user when the main switch S1 is ON. In this embodiment, the drive information includes that the kettle body 10 is not on the power supply base 70. The main switch S1 (e.g., a pushbutton) is provided with a light that is lighted when the main switch S1 is turned on. Further, the power supply unit 50 has a sound output part 141 configured to output sound. When the kettle body 10 is not on the power supply base 70, the control part 66 indicates the drive information by blinking the light of the main switch S1 and/or outputting attention (caution) sound from the sound output part 141.

The control part 66 is configured to stop power supply to the heater 49 while keeping the main switch S1 ON, if the kettle body 10 is removed from the power supply base 70 while the main switch S1 is ON. The control part 66 is also configured to restart power supply to the heater 49 if the kettle body 10 is placed on the power supply base 70 again within a predetermined time period after the stop. Further, the control part 66 is configured to turn off the main switch S1 if the kettle body 10 is not on the power supply base 70 even if a predetermined time elapses after power supply to the heater 49 is stopped while the main switch S1 is kept on. The predetermined time is, for example, any one of time periods of one to five seconds. By provision of such a structure of the electric kettle 1, the main switch S1 is not turned off even if a user keeps the kettle body 10 being removed from the power supply base 70 for a relatively short time, or the kettle body 10 is unintentionally tilted, during power supply to the heater 49. This improves convenience for the user. The control part 66 may be configured to control the main switch S1 and the sound output part 141 to indicate the drive information during the above-described predetermined time, thereby urging the user to place the kettle body 10 on the power supply base 70.

Next, the switching part 200 is described with reference to FIGS. 19 and 20. The switching part 200 is configured to switch the battery pack for supplying power to the heater 49 between the battery packs 100A, 100B.

FIG. 20 shows an image of the circuit configuration of the switching part 200. The switching part 200 mainly includes a first power supply part 211, a first booster circuit 212, a first FET drive circuit 213, a first voltage detection circuit 214, a second power supply part 221, a second booster circuit 222, a second FET drive circuit 223, a second voltage detection circuit 224 and a check power source 230. The first and second booster circuits 212, 222 are also referred to as a charge pump. The switching part 200 further has switching elements Q1 to Q4. Each of the switching elements Q1 to Q4 is an FFT (field effect transistor).

The first power supply part 211 is a circuit configured to generate a certain voltage (constant voltage) ($V_1$=15 [V]). The first booster circuit 212 is configured to boost the voltage of the battery pack 100A mounted on the mounting part 91A, by input of a pulse from the control part 66. The voltage (($V_{BAT1}$+$V_1$) [V]) boosted by the first booster circuit 212 is applied to the first FET drive circuit 213.

The first FET drive circuit 213 is configured to control drive of the switching elements Q1, Q2. The first FET drive circuit 213 controls energization from the battery pack 100A to the heater 49 via the power supply connection part 72 and the power receiving connection part 42 by turning on and off the switching elements Q1, Q2.

The first voltage detection circuit 214 is configured to detect a voltage between the switching elements Q1, Q2. The first voltage detection circuit 214 is configured to be in a low output state when the detected voltage is high, and to be in a high output state when the detected voltage is low. The detection results of the first voltage detection circuit 214 are outputted to the control part 66 and the second FET drive circuit 223. In this embodiment, a high voltage refers to a voltage of not less than about 30 volts and not more than about 42 volts, and a low voltage is a voltage of near zero volt.

As shown in FIG. 20, the switching elements Q1, Q2 are connected in series and have respective diodes. The diodes of the switching elements Q1, Q2 are arranged to be oriented in opposite directions to each other in order to prevent discharge from the battery pack 100A and backflow of current from the battery pack 100B.

Similarly, the second power supply part 221 is a circuit configured to generate a certain voltage (constant voltage) ($V_2$=15 [V]). The second booster circuit 222 is configured to boost the voltage of the battery pack 100B mounted on the mounting part 91B, by an instruction of the control part 66. The voltage (($V_{BAT2}$+$V_2$) [V]) boosted by the second booster circuit 222 is applied to the second FET drive circuit 223.

The second FET drive circuit 223 is configured to control drive of the switching elements Q3, Q4. The second FET drive circuit 223 controls energization from the battery pack 100B to the heater 49 via the power supply connection part 72 and the power receiving connection part 42 by turning on and off the switching elements Q3, Q4.

The second voltage detection circuit 224 is configured to detect a voltage between the switching elements Q3, Q4. The second voltage detection circuit 224 is configured to be in a low output state when the detected voltage is high, and to be in a high output state when the detected voltage is low. The detection results of the second voltage detection circuit 224 are outputted to the control part 66 and the first FET drive circuit 213.

Operations of the first and second FET drive circuits 213, 223 are now described. The first FET drive circuit 213 is configured to turn off the switching elements Q1, Q2 when the second voltage detection circuit 224 is in a low output state (i.e., when the voltage between the switching elements Q3, Q4 is high). Further, the first FET drive circuit 213 is configured to turn on the switching elements Q1, Q2 when the second voltage detection circuit 224 is in a high output state (i.e., when the voltage between the switching elements Q3, Q4 is low). The second FET drive circuit 223 is configured to turn off the switching elements Q3, Q4 when the first voltage detection circuit 214 is in a low output state (i.e., when the voltage between the switching elements Q1, Q2 is high). Further, the second FET drive circuit 223 is configured to turn on the switching elements Q3, Q4 when the first voltage detection circuit 214 is in a high output state (i.e., when the voltage between the switching elements Q1, Q2 is low). With such configuration, the switching part 200 can switch the battery pack for supplying power to the heater 49 between the battery packs 100A, 100B.

In this embodiment, the switching part 200 is further configured to detect abnormality (short circuit) of the switching elements Q1 to Q4. As described above, during power supply from the battery pack 100A to the heater 49, the switching elements Q1, Q2 are ON and the switching elements Q3, Q4 are OFF. During this time, if there is no abnormality in the switching elements Q3, Q4, the voltage between the switching elements Q3, Q4 is low and the second voltage detection circuit 224 is in a high output state (in other words, the second voltage detection circuit 224 outputs a HIGH signal). On the other hand, if the switching element Q3 or Q4 is short-circuited during power supply from the battery pack 100A to the heater 49, the voltage between the switching elements Q3, Q4 becomes high and the second voltage detection circuit 224 is in a low output state (in other words, the second voltage detection circuit 224 outputs a LOW signal). In other words, when an output from the second voltage detection circuit 224 to the control part 66 is LOW during power supply from the battery pack 100A to the heater 49, it means that the switching element Q3 or Q4 may be short-circuited ("first state").

Similarly, during power supply from the battery pack 100B to the heater 49, the switching elements Q3, Q4 are ON and the switching elements Q1, Q2 are OFF. During this time, if there is no abnormality in the switching elements Q1, Q2, the voltage between the switching elements Q1, Q2 is low and the first voltage detection circuit 214 outputs a HIGH signal. On the other hand, if the switching element Q1 or Q2 is short-circuited during power supply from the battery pack 100B to the heater 49, the voltage between the switching elements Q1, Q2 becomes high and the first voltage detection circuit 214 is in a low output state (in other words, the first voltage detection circuit 214 outputs a LOW signal). In other words, when an output from the first voltage detection circuit 214 to the control part 66 is LOW during power supply from the battery pack 100B to the heater 49, it means that the switching element Q1 or Q2 may be short-circuited ("second state").

In this embodiment, in the above-described first state, the control part 66 causes the first booster circuit 212 to turn off the switching elements Q1, Q2 to stop power supply from the battery pack 100A to the heater 49. Similarly, in the above-described second state, the control part 66 causes the second booster circuit 212 to turn off the switching elements Q3, Q4 to stop power supply from the battery pack 100B to the heater 49. Such control of the control part 66 prevents the electric kettle 1 from operating when any of the switching elements Q1 to Q4 is in failure.

In this embodiment, the switching part 200 is configured to detect abnormality of the switching elements Q2, Q4 even when power is not being supplied from the battery pack 100A or 100B to the heater 49. The check power source 230 is provided to apply a voltage to the switching elements Q2, Q4 when the switching elements Q1 to Q4 are OFF. If an abnormal value (a LOW signal) is outputted from the first voltage detection circuit 214 or/and the second voltage detection circuit 224 when a voltage is applied to the switching elements Q2, Q4 in the OFF state of the switching elements Q1 to Q4, it means that the switching element Q2 or/and Q4 may be in failure. Therefore, if an output from the first voltage detection circuit 214 or/and the second voltage detection circuit 224 is LOW when a voltage is applied by the check power source 230, the control part 66 stops subsequent power supply from the battery pack 100A, 100B to the heater 49.

As described above, in the electric kettle 1 of this embodiment, the battery pack for supplying power to the heater 49 can be switched between the battery packs 100A, 100B. Further, backflow of current from the battery pack 100A to the battery pack 100B and from the battery pack 100B to the battery pack 100A is prevented. Power supply to the heater 49 is stopped when abnormality of any one of the switching elements Q1 to Q4 is detected.

Upon detection of abnormality of the switching elements Q1 to Q4, the control part 66 may indicate the occurrence of the abnormality by using the main switch S1, the sound output part 141 and/or the display part 86.

Effects

The above-described electric kettle 1 according to this embodiment has the following effects.

The electric kettle 1 is configured to supply power to the heater 49 via the power supply connection part 72 and the power receiving connection part 42 when the detection part 130 detects that the kettle body 10 is on the power supply base 70. The electric kettle 1 is further configured to stop power supply to the heater 49 via the power supply connection part 72 and the power receiving connection part 42 when the detection part 130 detects that the kettle body 10 is not on the power supply base 70. Further, the electric kettle 1 is configured such that the power supply connection part 72 and the power receiving connection part 42 are disconnected after the detection part 130 detects that the kettle body 10 is not on the power supply base 70 (that is, after the electric kettle 1 stops power supply to the heater 49 via the power supply connection part 72 and the power receiving connection part 42). This reduces the possibility of generation of arc discharge (occurrence of arc discharge, generation of spark) between the power supply connection part 72 and the power receiving connection part 42, as compared with a structure in which the power supply connection part 72 and the power receiving connection part 42 are disconnected before or upon detection that the kettle body 10 is not on the power supply base 70. Accordingly, the durability of the power supply connection part 72 and the power receiving connection part 42 is improved, so that the durability of the electric kettle 1 is improved.

The electric kettle 1 is configured to supply power from the battery packs 100A, 100B to the heater 49 via the power supply connection part 72 and the power receiving connection part 42. In the case of using a DC power source, current flows in a fixed (constant) direction, so that it is possible that the duration of arc discharge is elongated and electric contacts easily wear. In this embodiment, however, the electric kettle 1 is configured such that the power supply connection part 72 and the power receiving connection part 42 are disconnected after the detection part 130 detects that the kettle body 10 is not on the power supply base 70 (that is, after the electric kettle 1 stops power supply to the heater 49 via the power supply connection part 72 and the power receiving connection part 42), so that the electric kettle 1 can improve the durability of the power supply connection part 72 and the power receiving connection part 42 while using a DC power source.

The control part 66 does not supply to the heater 49 when it is detected that the kettle body 10 is not on the power supply base 70. Therefore, power is not supplied to the heater 49 when the power supply connection part 72 (the power supply connection terminals 73) is exposed. This ensures the safety of the electric kettle 1 when a user unintentionally touches the power supply connection part 72 or when water or other liquid drops onto the power supply connection part 72.

The electric kettle 1 has the first energizing terminals 131A, 131B provided on the power supply base 70, and the second energizing terminals 132A, 132B provided on the kettle body 10. Therefore, whether the kettle body 10 is on the power supply base 70 can be detected depending on whether the first energizing terminals 131A, 131B are in contact with the second energizing terminals 132A, 132B (whether a current is carried therebetween (energization is carried out therebetween).

The electric kettle 1 detects that the kettle body 10 is on the power supply base 70 when the first energizing terminals 131A, 131B are respectively in contact with the second energizing terminals 132A, 132B, and detects that the kettle body 10 is not on the power supply base 70 when one of the first energizing terminals 131A, 131B is not in contact with the corresponding or associated one of the second energizing terminal 132A or 132B. In other words, the electric kettle 1 detects that the kettle body 10 is on the power supply base 70 when both of the first energizing terminals 131A, 131B are respectively in contact with the second energizing terminals 132A, 132B (when a placing condition is satisfied), and detects that the kettle body 10 is not on the power supply base 70 when the placing condition is not satisfied. Therefore, the electric kettle 1 can more accurately detect whether the kettle body 10 is on the power supply base 70, as compared with a structure having one first energizing terminal on the power supply base 70 and one second energizing terminal on the kettle body 10 and configured to detect whether the kettle body 10 is on the power supply base 70 depending on whether the one first energizing terminal is in contact with the one second energizing terminal.

The first energizing terminals 131A, 131B are arranged symmetrically to the power supply connection part 72, and the second energizing terminals 132A, 132B are arranged symmetrically to the power receiving connection part 42. Therefore, when the kettle body 10 (the lower surface 41) is tilted relative to the power supply base 70 (the upper surface 71), it is likely that at least one of the first energizing terminals 131A, 131B is not in contact with the associated second energizing terminal 132A or 132B. Therefore, the electric kettle 1 can furthermore accurately detect whether the kettle body 10 is on the power supply base 70.

Further, the electric kettle 1 is configured such that the circuit for the temperature sensor Tc is formed (activated, completed, closed) by contact between the first energizing terminals 131A, 131B and the second energizing terminals 132A, 132B. Thus, the detection part 130 can perform a function of detecting whether the kettle body 10 is on the power supply base 70 and a function of measuring the liquid temperature in the liquid containing part 48. Further, when a measurement result of the temperature sensor Tc is obtained, it can be determined that the kettle body 10 is on the power supply base 70, and when a measurement result of the temperature sensor Tc is not obtained, it can be determined that the kettle body 10 is not on the power supply base 70.

The second energizing terminals 132A, 132B each have the spring 301 that is expandable and compressible in the up-down direction. This can ensure contact between the first energizing terminals 131A, 131B and the second energizing terminals 132A, 132B even if at least one of the first energizing terminals 131A, 131B and the second energizing terminals 132A, 132B has a dimensional error in the up-down direction.

The spring 301 is provided on top of each of the second energizing terminals 132A, 132B provided on the kettle body 10, so that the possibility that liquid in the kettle body 10 unintentionally adheres to the spring 301 can be reduced.

Thus, the possibility that the spring 301 is deteriorated due to such adherence of liquid can be reduced.

In this embodiment, the power receiving connection terminals 45 are provided in the recessed part recessed upward from the lower surface 41 of the kettle body 10 and extend in the up-down direction. The power supply connection terminals 73 protrude upward from the upper surface 71 of the power supply base 70 and extend in the up-down direction. Thus, the contact areas between the power supply connection terminals 73 and the power receiving connection terminals 45 extend in the up-down direction. Therefore, the area of contact between the power supply connection terminal 73 and the power receiving connection terminals 45 is relatively large, so that power supply from the power supply connection part 72 to the power receiving connection part 42 can be further stabilized. Further, the pair of the power receiving connection terminals 45 are configured such that the power supply connection terminal 73 is inserted and held therebetween. This structure, which is configured such that the power supply connection terminal 73 is inserted and held between the power receiving connection terminals 45 to thereby ensure a large contact area, is particularly useful when a DC current is passed therethrough.

When the kettle body 10 is on the power supply base 70, each of the power receiving connection terminals 45 is in contact with the power supply connection terminal 73 over the range or distance (the contact length L1) from the lower end 45B of the power receiving connection terminal 45 to the upper end 73T of the power supply connection terminal 73 in the up-down direction, and the contact length L1 is longer than the stroke length L2 of the spring 301. Therefore, when the upward moving distance Lm of the kettle body 10 exceeds the stroke length L2 of the spring 301, the first energizing terminals 131A, 131B and the second energizing terminals 132A, 132B are disconnected and the passage of a current (energization) from the power supply connection terminal 73 to the power receiving connection terminal 45 is stopped, and thereafter, when the upward moving distance Lm of the kettle body 10 exceeds the contact length L1, the power supply connection terminal 73 and the power receiving connection terminal 45 are disconnected.

The power supply unit 50 has the mounting unit 90 for mounting the battery packs 100A, 100B, which facilitates handling of the kettle body 10 as compared with a structure in which the battery packs 100A, 100B are mounted onto the kettle body 10. Further, with the structure in which the battery packs 100A, 100B can be mounted on the power supply unit 50, a user can use the electric kettle 1 at a desired place, so that the degree of freedom of the use environment of the electric kettle 1 is enhanced.

The power supply unit 50 has the power supply unit grip part 85 extending upward from the power supply base 70 and configured to be held by a user. Therefore, the user can hold the power supply unit grip part 85 and carry the power supply unit 50 alone or carry the kettle body 10 and the power supply unit 50 together. Thus, the electric kettle 1 is provided with high convenience for the user.

The power supply base 70 on which the kettle body 10 is placed is arranged on one surface (the front surface 81) side of the wall part 80 (the power supply unit grip part 85), and the mounting unit 90 for mounting the battery packs 100A, 100B is arranged on the other surface (the rear surface 82) side of the wall part 80. Thus, the possibility that liquid to be used for the electric kettle 1 adheres to the mounting unit 90 can be reduced, so that the safety and durability of the electric kettle 1 is improved. Furthermore, when a user opens the lid 21 of the kettle body 10 and puts liquid into the kettle body 10 while leaving the kettle body 10 placed on the power supply base 70, the possibility that the liquid adheres to the mounting unit 90 or the battery packs 100A, 100B can be reduced. Thus, the safety and durability of the electric kettle 1 is improved, and the degree of freedom in handling of the electric kettle 1 is improved.

The mounting unit 90 has the slide rails 92 extending in the up-down direction and configured such that the battery packs 100A, 100B are removably coupled thereto (mounted thereon) by sliding on the slide rails 92 in the up-down direction. Thus, even if the liquid in the kettle body 10 adheres to the slide rails 92, the liquid can easily drop downward, so that the safety and durability of the electric kettle 1 is further improved.

The power supply unit grip part 85 is arranged above the mounting unit 90 on the wall part 80. Thus, the attitude of the electric kettle 1 can be stabilized with the battery packs 100A, 100B mounted on the rear surface 82 of the wall part 80 and with the kettle body 10 placed on the power supply base 70 on the front surface 81 side of the wall part 80. Accordingly, the possibility of tilting of the electric kettle 1 can be reduced when the electric kettle 1 is carried by a user, so that the electric kettle 1 is provided which is easier to carry.

In this embodiment, the electric kettle 1 is configured such that the center of gravity of the electric kettle 1 is located on or near the wall part 80 irrespective of the amount of liquid in the kettle body 10 when the battery packs 100A, 100B are mounted on the mounting unit 90 and the kettle body 10 is placed on the power supply unit 50. Thus, the power supply unit grip part 85 is arranged directly above the center of gravity of the electric kettle 1 in use, so that the electric kettle 1 is provided which is further easier to carry.

The power supply unit 50 has the rib 75 protruding upward from the power supply base 70 and facing the front surface 81 of the wall part 80. Thus, the possibility that the electric kettle 1 is displaced from the power supply base 70 can be reduced when the electric kettle 1 is carried, so that the electric kettle 1 is provided which is easier to carry.

The power supply base 70 has the through holes 77 formed through the power supply base 70 in the up-down direction. Thus, even if the liquid adheres to the power supply base 70, the liquid can be discharged through the through holes 77. Accordingly, the possibility that the liquid stays on the power supply base 70 can be reduced, so that the safety and durability of the electric kettle 1 is further improved.

The power supply base 70 includes the inclined surface 74 inclined downward from the central portion of the upper surface 71 toward the outer edge of the power supply base 70. Thus, even if liquid adheres to the power supply base 70, the liquid is discharged toward the outside. Further, the through holes 77 are arranged closer to the outer edge of the power supply base 70 than to the central portion of the power supply base 70. Thus, the liquid that can flow toward the outer edge is discharged through the through holes 77 arranged close to the outer edge. Accordingly, the possibility that the liquid stays on the power supply base 70 can be further reduced, so that the safety and durability of the electric kettle 1 is furthermore improved.

The wall part 80 of the power supply unit 50 has the recessed part 83 formed in the front surface 81 and recessed from the front surface 81 toward the rear surface 82 of the wall part 80. The recessed part 83 is shaped to conform to the outer peripheral surface 31 of the side wall part 30 of the kettle body 10. Thus, the user can place the kettle body 10 on the power supply base 70 along the recessed part 83, so that the kettle body 10 is placed in a proper position.

The power receiving connection part 42 of the kettle body 10 and the power supply connection part 72 of the power supply base 70 are configured to be fitted together when the kettle body 10 is placed on the power supply base 70. The power receiving connection part 42 and the power supply connection part 72 are configured to restrict rotation of the kettle body 10 on the power supply base 70 when fitted together. Thus, power can be stably supplied from the power supply unit 50 to the kettle body 10.

The upper end of the rib 75 in the up-down direction is located above the lower end of the kettle grip part 23 of the kettle body 10 placed on the power supply base 70. Thus, the user can place the kettle body 10 on the power supply unit 50 such that the kettle grip part 23 is located between the rib 75 and the wall part 80 in the front-rear direction. Further, in this embodiment, the power receiving connection part 42 and the power supply connection part 72 are configured to be fitted together within a range in which the kettle grip part 23 is located between the rib 75 and the wall part 80 in the front-rear direction. Thus, the rib 75 has a positioning function for properly placing the kettle body 10 on the power supply base 70 in cooperation with the wall part 80. Accordingly, the user can easily place the kettle body 10 in a proper position.

Second Embodiment

A power supply connection part 72C, a power receiving connection part 42C and a detection part 130 according to a second embodiment of the present disclosure is described with reference to FIG. 21. In the following description, components identical to those of the above-described embodiment are given the same numerals and not described. The power supply connection part 72C, the power receiving connection part 42C and the detection part 130 are schematically shown in FIG. 21. In this embodiment, unlike the first embodiment, the power supply connection part 72C and the power receiving connection part 42C are configured such that an upper end of a power supply connection terminal 73C comes into contact with a lower end of the power receiving connection terminal 45C. Further, a spring 302C is provided on top of the power receiving connection terminal 45C. The spring 302C is supported by the kettle body 10 so as to be expandable and compressible in the up-down direction. The spring 302C is configured such that a stroke length (a deflection length, a spring travel) L1C of the spring 302C in the up-down direction is longer than the stroke length (a deflection length, a spring travel) L2 of the spring 301 provided on the second energizing terminal 132. In FIG. 21, (a1) shows a state in which the kettle body 10 is on the power supply base 70; (b1) shows a state in which the kettle body 10 has been moved upward (lifted) from the state (a1) and no load is applied to the spring 301 (the spring 301 has returned to its free length); (c1) shows a state in which the kettle body 10 has been further moved upward from the state (b1) and no load is applied to the spring 302C (the spring 302C has returned to its free length); and (d1) shows a state in which the kettle body 10 has been further moved upward from the state (c1).

When the kettle body 10 placed on the power supply base 70 (see the state (a1) in FIG. 21) is moved upward, as shown in the state (b1) FIG. 21, the connection between the first energizing terminal 131 and the second energizing terminal 132 is maintained while the upward moving distance Lm of the kettle body 10 is not longer than the stroke length L2 of the spring 301. Then, as shown in the state (c1) in FIG. 21, when the upward moving distance Lm of the kettle body 10 exceeds the stroke length L2 of the spring 301, the first energizing terminal 131 and the second energizing terminal 132 are disconnected. Then, as shown in the state (d1) in FIG. 21, when the kettle body 10 is further moved upward and the upward moving distance Lm of the kettle body 10 exceeds the stroke length L1C of the spring 302C provided on top of the power receiving connection terminal 45C, the power supply connection part 72C and the power receiving connection part 42C are disconnected. The other components of the electric kettle 1 according to the second embodiment are similar to those of the first embodiment and will not be described and shown here.

In the second embodiment, the power supply connection part 72C and the power receiving connection part 42C are also disconnected after the connection between the first energizing terminal 131 and the second energizing terminal 132 are disconnected (that is, after the electric kettle 1 stops power supply to the heater 49 via the power supply connection part 72C and the power receiving connection part 42C). Therefore, the electric kettle 1 according to this embodiment has the same effects as that of the first embodiment.

Third Embodiment

A power supply connection part 72C, a power receiving connection part 42C and a detection part 130D according to a third embodiment of the present disclosure is described with reference to FIG. 22. Like in the second embodiment, the power supply connection part 72C, the power receiving connection part 42C and the detection part 130D are schematically shown in FIG. 22. In this embodiment, the length of a second energizing terminal 132D in the up-down direction is substantially equal to the length from an upper end of the spring 302C provided on top of the power receiving connection terminal 45C to the lower end of the power receiving connection terminal 45C when the kettle body 10 is on the power supply base 70. No spring is provided on top of the second energizing terminal 132D. In FIG. 22, (a2) shows a state in which the kettle body 10 is on the power supply base 70; (b2) shows a state in which the kettle body 10 has been moved upward from the state (a2) and no load is applied to the spring 302C (the spring 302C has returned to a free length); and (c2) shows a state in which the kettle body 10 has been further moved upward from the state (b2).

In this embodiment, when the kettle body 10 placed on the power supply base 70 is moved upward from the power supply base 70, the first energizing terminal 131 and the second energizing terminal 132D are disconnected (see the state (b2) in FIG. 22). Then, as shown in the state (c2) in FIG. 22, when the kettle body 10 is further moved upward and the upward moving distance Lm exceeds the stroke length L1C of the spring 302C provided on top of the power receiving connection terminal 45C, the power supply connection part 72C and the power receiving connection part 42C are disconnected. The other components of the electric kettle 1 according to the third embodiment are similar to those of the first embodiment and will not be described and shown here.

In the third embodiment, the power supply connection part 72C and the power receiving connection part 42C are disconnected after the first energizing terminal 131 and the second energizing terminal 132 are disconnected (that is, after the electric kettle 1 stops power supply to the heater 49 via the power supply connection part 72C and the power receiving connection part 42C). Therefore, the electric kettle 1 according to this embodiment has the same effects as that of the first embodiment.

<Correspondences>

Correspondences between the features of the above-described embodiments and the features of the present disclosure are as follows, but the features of the embodiments are merely exemplary and the features of the present disclosure are not limited to them.

The electric kettle 1 is an example of the "electric kettle".

The battery packs 100A, 100B are examples of the "battery pack".

The power receiving connection parts 42, 42C are examples of the "power receiving connection part".

The heater 49 is an example of the "heating part".

The kettle body 10 is an example of the "kettle body".

The power supply unit 50 is an example of the "power supply unit".

The power supply base 70 and the upper surface 71 are examples of the "power supply base" and the "upper surface", respectively.

The power supply connection parts 72, 72c are examples of the "power supply connection part".

The mounting unit 90 and the mounting parts 91A, 91B are examples of the "mounting unit".

The detection parts 130, 130D are examples of the "detection part".

The first energizing terminals 131A, 131B, 131 are examples of the "first detection part".

The second energizing terminals 132A, 132B, 132, 132D are examples of the "second detection part".

The first energizing terminals 131A, 131B are examples of the "third detection part" and the "fourth detection part".

The second energizing terminals 132A, 132B are examples of the "fifth detection part" and the "sixth detection part".

The liquid containing part is an example of the "liquid containing part".

The temperature sensor Tc is an example of the "temperature sensor".

The spring 301 is an example of the "first spring".

The spring 302C is an example of the "second spring".

The stroke length L2 is an example of the "stroke length of the first spring in the up-down direction".

The stroke length L1C is an example of the "stroke length of the second spring in the up-down direction".

The power supply connection terminals 73, 73C are examples of the "power supply connection terminal".

The power receiving connection terminals 45, 45C are examples of the "power receiving connection terminal".

OTHER EMBODIMENTS

In the above-described embodiments, when the main switch S1 is turned on, the control part 66 supplies power to the heater 49 if it is detected that the kettle body 10 is on the power supply base 70, and stops power supply to the heater 49 if it is detected that the kettle body 10 is not on the power supply base 70. The control part 66 may however be configured to supply power to the heater 49 not only when the kettle body 10 is on the power supply base 70, but at least either when the bottom switch 133 is ON or when the residual capacity of the battery packs 100A, 100B is a predetermined residual capacity or more. The predetermined residual capacity of the battery packs 100A, 100B may be a capacity required to boil a prescribed amount of water (liquid) within the kettle body 10. Further, the control part 66 may be configured to stop power supply to the heater 49 at least either when the kettle body 10 is not on the power supply base 70 or when the bottom switch 133 is OFF.

The control part 66 may be configured to indicate not only that the kettle body 10 is not on the power supply base 70, but also that the power supply unit 50 is not on a plane, and that the residual capacity of the battery packs 100A, 100B is not more than a predetermined residual capacity, by using the main switch S1, the sound output part 141 and/or the display part 86. The control part 66 may change the color and the blinking time of a light of the main switch S1, the duration of attention (caution) sound, marks or other indications to be displayed on the display part 86, and combinations thereof.

The control device 65 may be configured to obtain a predetermined set temperature and calculate the amount of liquid that can be heated up to the set temperature. The set temperature may be set by a user, for example, by using a temperature setting part 67 provided in the power supply unit 50 (see FIG. 19). The temperature setting part 67 is an input interface by which a user can set a temperature. In this case, for example, the control device 65 may store a predetermined relation between the amount of liquid in the kettle body 10 and power required to heat the liquid up to the set temperature, and calculate the amount of liquid that can be heated up to the predetermined temperature, based on the above-described relation and the residual capacity of the battery packs 100A, 100B that is obtained via the mounting unit 90. Further, the control part 66 may be configured to indicate the calculated liquid amount by using the main switch S1, the sound output part 141 and/or the display part 86. By provision of such a structure, if liquid of a displayed amount or less is put into the kettle body 10, the liquid can be heated up to the set temperature, for example, even when the residual capacity of the battery packs 100A, 100B is small.

In the above-described embodiments, the first energizing terminals 131A, 131B, 131 provided in the upper surface 71 of the power supply base 70 and the second energizing terminals 132A, 132B, 132 provided in the lower surface 41 of the kettle body 10, as well as the temperature sensor Tc, are employed to detect whether the kettle body 10 is on the power supply base 70. However, other sensors or devices such as a switch that is capable of detecting whether the kettle body 10 is on the power supply base 70 may be employed. For example, a push-in type switch like the bottom switch 133 may be provided in the lower surface 41 of the kettle body 10 to detect whether the kettle body 10 is on the power supply base 70 depending on whether this switch is pushed in. Alternatively, an electromagnetic sensor such as a Hall sensor for detecting contact between the kettle body 10 and the power supply base 70 may be provided to detect whether the kettle body 10 is on the power supply base 70.

The structures of the power supply connection parts 72, 72C, the power receiving connection parts 42, 42C and the detection parts 130, 130D are not limited to those of the above-described embodiments. For example, one or three or more terminals may be provided on each of the power supply base 70 and the kettle body 10 to detect whether the kettle body 10 is on the power supply base 70. Further, the first energizing terminals 131A, 131B, 131 and the second energizing terminals 132A, 132B, 132, 132D need not form a circuit for the temperature sensor Tc. The spring 301 need not be provided on the second energizing terminals 132A, 132B.

In an embodiment in which the spring(s) 301 is provided on the detection part 130 like in the first and second embodiments, the spring(s) 301 may be provided on either or both of the first energizing terminals 131, 131A, 131B and the second energizing terminals 132, 132A, 132B. Similarly, in an embodiment in which the spring 302C is provided on the power supply connection part 72C and the power receiving connection part 42C like in the third embodiment, the spring(s) 302C may be provided on either or both of the power supply connection terminal 73C and the power receiving connection terminal 45C. In this case, it may only be configured such that the stroke length of the spring provided on the detection part 130, 130D is shorter than the stroke length of the spring provided on at least one of the power supply connection part 72, 72C and the power receiving connection part 42, 42C. The springs 301, 302C are not limited to a compression coil spring, but may be other springs configured to be expandable and compressible in the up-down direction.

The electric kettle 1 may be configured to wirelessly communicate with an external device, and various settings for the electric kettle 1 may be performed with the external device. For example, a portable terminal may be used which is capable of wireless communication and is provided with applications for driving the electric kettle 1 and performing the various settings such as temperature setting, and the control part 66 of the electric kettle 1 may perform various controls according to instructions via the applications. Further, the control part 66, 66a may transmit the various settings (performed for the electric kettle 1 by the user) and use history information of the electric kettle 1 to the portable terminal via a communication part provided in the electric kettle 1. For example, the control part 66 may be configured to obtain signals from the main switch S1, the bottom switch 133, the first energizing terminals 131, the second energizing terminals 132 and the temperature sensor Tc, and transmit to the portable terminal, information that the main switch S1 of the electric kettle 1 has been turned on, that the kettle body 10 has been removed from the power supply base 70, or that the power supply unit 50 has been moved away from the plane, if such is detected from the obtained signals.

In the above-described embodiments, whether the kettle body 10 is on the power supply base 70 is detected depending on whether the two terminals (the first energizing terminals 131A, 131B) provided on the power supply base 70 are in contact with the two terminals (the second energizing terminals 132A, 132B) provided on the kettle body 10, that is, whether a measurement result of the temperature sensor Tc is obtained. Whether the kettle body 10 is on the power supply base 70 may however be detected depending on whether current can be carried between the first energizing terminals 131A, 131B and the second energizing terminals 132A, 132B, instead of depending on whether a measurement result of the temperature sensor Tc is obtained. Further, where a pair of terminals are provided on the power supply base 70 and another pair of terminals are provided on the kettle body 10, the terminals on the power supply base 70 may only be arranged to come into contact with the terminals on the kettle body 10, respectively. Thus, the terminals on the power supply base 70 need not be arranged substantially symmetrically to the power supply connection part 72, and the terminals on the kettle body 10 need not be arranged substantially symmetrically to the power receiving connection part 42.

The electric kettle 1 need not have the bottom switch 133. A battery pack other than the battery packs 100A, 100B of 36 volts (e.g., a battery pack of 18 volts) may be mounted on the mounting unit 90.

Control by the control part 66 may be performed by using not a CPU but other kinds of control circuits including a programmable logic device such as an ASIC (application specific integrated circuit) and an FPGA (field program-mable gate array). In the foregoing embodiments, parts or all of the functions and processing implemented by software may be implemented by hardware. In addition, parts or all of the functions and process implemented by hardware may be implemented by software. As the hardware, for example, various circuits, such as an integrated circuit, a discrete circuit, or a combined circuit module thereof can be used.

Further, in view of the nature of the present disclosure and the above-described embodiments, the following aspects are provided. At least one of the aspects can be employed in combination with any of the above-described embodiments and the claimed invention.

(Aspect 1)

The control part is configured to control power supply to the heating part via the power supply connection part and the power receiving connection part based on a detection result of the detection part.

(Aspect 2)

The control part supplies power to the heating part when at least one predetermined condition is satisfied, and does not supply power to the heating part when the at least one predetermined condition is not satisfied, and the at least one predetermined condition includes that the kettle body is on the power supply base.

(Aspect 3)

A contact length between the power supply connection terminal and the power receiving connection terminal in an up-down direction or the stroke length of the second spring is longer than a contact length between the first and second detection parts in an up-down direction or the stroke length of the first spring.

(Aspect 4)

The electric kettle further comprises an indication part configured to indicate drive information of the electric kettle; and the control part is further configured to control the indication part based on a detection result of the detection part, and to cause the indication part to indicate, as the drive information, that the kettle body is not on the power supply base when the kettle body is not placed on the power supply base.

(Aspect 5)

The mounting unit is configured such that the two battery packs are removably coupled thereto, and the battery packs are electrically connected in parallel.

(Aspect 6)

The power supply unit includes a plate part having a first surface and a second surface, the power supply base is arranged on a side of the first surface of the plate part, and the mounting unit is arranged on a side of the second surface of the plate part.

(Aspect 7) The plate part is connected to the power supply base and extends upward from the power supply base, and the mounting unit is arranged on the second surface of the plate part.

(Aspect 8)

The mounting unit has a rail that extends in the up-down direction and that is configured such that the battery pack is removably coupled thereto by sliding in the up-down direc-tion.

(Aspect 9)

The plate part has a grip part that is provided above the mounting unit and configured to be held by a user.

(Aspect 10)

The power supply unit has a rib protruding upward from the power supply base and facing the first surface of the plate part.

(Aspect 11)

The power supply base has a through hole formed through the power supply base in the up-down direction.

(Aspect 12)

The power supply connection part is arranged on a central portion of an upper surface of the power supply base, the upper surface includes an inclined surface inclined downward from the central portion toward an outer edge of the power supply base, and the through hole is closer to the outer edge of the power supply base than to the central portion.

(Aspect 13)

The plate part has a recessed part formed in the first surface and recessed toward the second surface of the plate part, the recessed part being shaped to conform to a side peripheral surface of the kettle body placed on the power supply base.

(Aspect 14)

The power receiving connection part of the kettle body and the power supply connection part of the power supply base are configured to be fitted together when the kettle body is placed on the power supply base and to restrict rotation of the kettle body on the power supply base.

DESCRIPTION OF THE REFERENCE
NUMERALS

1 . . . electric kettle, 10 . . . kettle body, 20 . . . body unit, 21 . . . lid, 22 . . . spout, 23 . . . kettle grip part, 30 . . . side wall part, 31 . . . outer peripheral surface, 40 . . . bottom part, 41 . . . lower surface, 42 . . . power receiving connection part, 42C . . . power receiving connection part, 42s . . . side face, 44 . . . plate-like member, 44s . . . face, 45 . . . power receiving connection terminal, 45B . . . lower end, 45C . . . power receiving connection terminal, 46 . . . inclined face, 48 . . . liquid containing part, 49 . . . heater, 50 . . . power supply unit, 60 . . . base part, 62 . . . side wall, 63 . . . lower surface, 65 . . . control device, 66 . . . control part, 67 . . . temperature setting part, 70 . . . power supply base, 71 . . . upper surface, 72 . . . power supply connection part, 72C . . . power supply connection part, 72s . . . side face, 72u . . . upper face, 73 . . . power supply connection terminal, 73C . . . power supply connection terminal, 73T . . . upper end, 74 . . . inclined surface, 75 . . . rib, 77 . . . through hole, 79 . . . notch, 79c . . . face, 79g . . . inclined face, 79s . . . face, 80 . . . wall part, 81 . . . front surface, 82 . . . rear surface, 83 . . . recessed part, 85 . . . power supply unit grip part, 86 . . . display part, 90 . . . mounting unit, 91A, 91B . . . mounting part, 92 . . . slide rail, 93 . . . positive input terminal, 94 . . . negative input terminal, 95 . . . lock receiving hole, 100A, 100B . . . battery pack, 101 . . . rail receiving part, 102 . . . positive output terminal, 103 . . . negative output terminal, 104 . . . connector part, 105 . . . lock member, 106 . . . unlock button, 130 . . . detection part, 130D . . . detection part, 131 . . . first energizing terminal, 131A . . . first energizing terminal, 131B . . . first energizing terminal, 132 . . . second energizing terminal, 132A . . . second energizing terminal, 132B . . . second energizing terminal, 132D . . . second energizing terminal, 133 . . . bottom switch, 134 . . . button, 135 . . . button receiver, 141 . . . sound output part, 200 . . . switching part, 211 . . . first power supply part, 212 . . . first booster circuit, 214 . . . first voltage detection circuit, 221 . . . second power supply part, 222 . . . second booster circuit, 224 . . . second voltage detection circuit, 230 . . . check power source, 301 . . . spring, 302C . . . spring, L1 . . . contact length, L2 . . . contact length, stroke length, Lm . . . moving distance, L1C . . . stroke length, L1D . . . stroke length, 213 . . . first FET drive circuit, 223 . . . second FET drive circuit, S1 . . . main switch, Q1, Q2, Q3, Q4 . . . switching element, Tc . . . temperature sensor

The invention claimed is:

1. An electric kettle, comprising:
a kettle body having a power receiving connection part configured to receive power from an external power source, and a heater configured to heat liquid contained in the kettle body by the power received by the power receiving connection part; and
a power supply unit configured such that the kettle body is placed on the power supply unit, and configured to supply power to the kettle body, the power supply unit including:
  a power supply base configured such that the kettle body is placed on top of the power supply base, the power supply base including a power supply connection part that is configured to be removable from the power receiving connection part and to be electrically connected to the power receiving connection part; and
  a mounting unit configured to be removably coupled to a battery pack as the external power source for supplying power to the heater via the power supply connection part and the power receiving connection part; and
a detection part configured to detect whether the kettle body is on the power supply base, wherein:
the power supply connection part and the detection part are functionally separated,
the detection part includes a first detection part and a second detection part that are symmetrically located with respect to a center of the power supply connection part,
the electric kettle is configured to supply power to the heater via the power supply connection part and the power receiving connection part when the detection part detects that the kettle body is on the power supply base,
the electric kettle is configured to stop power supply to the heater via the power supply connection part and the power receiving connection part when the detection part detects that the kettle body is not on the power supply base, and
the power supply connection part and the power receiving connection part are configured such that the power supply connection part and the power receiving connection part are disconnected after the detection part detects that the kettle body is not on the power supply base.

2. The electric kettle as defined in claim 1, wherein:
the first detection part is at a different position from the power supply connection part on the power supply base, and the second detection part is at a different position from the power receiving connection part on the kettle body, and
the detection part is configured to detect that the kettle body is on the power supply base when the first detection part and the second detection part are in contact with each other, and to detect that the kettle body is not on the power supply base when the first detection part and the second detection part are not in contact with each other.

3. The electric kettle as defined in claim 2, wherein:
the first detection part and the second detection part have conductivity, and
the detection part is configured to detect that the kettle body is on the power supply base when current is carried between the first detection part and the second detection part, and to detect that the kettle body is not on the power supply base when current is not carried between the first detection part and the second detection part.

4. The electric kettle as defined in claim 3, wherein:
the first detection part includes a third detection part and a fourth detection part,
the second detection part includes a fifth detection part and a sixth detection part,
the detection part is configured to detect that the kettle body is on the power supply base when a placing condition that the third detection part and the fourth detection part are respectively in contact with the fifth detection part and the sixth detection part is satisfied, and
the detection part is configured to detect that the kettle body is not on the power supply base when the placing condition is not satisfied.

5. The electric kettle as defined in claim 4, wherein:
the kettle body has a liquid containing part for storing liquid,
the detection part further includes a temperature sensor configured to measure a temperature of the liquid in the liquid containing part, and
the detection part is configured to measure the temperature of the liquid in the liquid containing part with the temperature sensor when current is carried between the third detection part and the fifth detection part and between the fourth detection part and the sixth detection part.

6. The electric kettle as defined in claim 5, wherein:
the power supply connection part has a power supply connection terminal,
the power receiving connection part has a power receiving connection terminal, and
the power supply connection terminal and the power receiving connection terminal are configured such that one of the power supply connection terminal and the power receiving connection terminal sandwich the other and to be electrically connected to each other.

7. The electric kettle as defined in claim 6, wherein:
the first detection part is on an upper surface of the power supply base,
the power supply connection terminal is on the upper surface of the power supply base, protrudes upward from the upper surface, and extends in an up-down direction such that an upper end of the power supply connection terminal is located above an upper end of the first detection part.

8. The electric kettle as defined in claim 7, wherein:

the first spring that is on the second detection part, the first spring has a stroke length in the up-down direction such that the power supply connection part and the power receiving connection part are disconnected after the detection part detects that the kettle body is not on the power supply base when the kettle body placed on the power supply base is moved upward.

9. The electric kettle as defined in claim 2, wherein:

the first detection part includes a third detection part and a fourth detection part, the second detection part includes a fifth detection part and a sixth detection part, the detection part is configured to detect that the kettle body is on the power supply base when a placing condition that the third detection part and the fourth detection part are respectively in contact with the fifth detection part and the sixth detection part is satisfied, and the detection part is configured to detect that the kettle body is not on the power supply base when the placing condition is not satisfied.

10. The electric kettle as defined in claim 9, wherein:

the power supply connection part is on a central portion of an upper surface of the power supply base, and the third detection part and the fourth detection part are arranged symmetrically to the power supply connection part, and the power receiving connection part is on a central portion of a lower surface of the kettle body, and the fifth detection part and the sixth detection part are arranged symmetrically to the power receiving connection part.

11. The electric kettle as defined in claim 9, wherein:

the kettle body has a liquid containing part for storing liquid, the detection part further includes a temperature sensor configured to measure a temperature of the liquid in the liquid containing part, and the detection part is configured to measure the temperature of the liquid in the liquid containing part with the temperature sensor when current is carried between the third detection part and the fifth detection part and between the fourth detection part and the sixth detection part.

12. The electric kettle as defined in claim 9, wherein:

the detection part includes a first spring that is on at least one of the first and second detection parts and is expandable and compressible in an up-down direction, and the first spring has a stroke length in the up-down direction such that the power supply connection part and the power receiving connection part are disconnected after the detection part detects that the kettle body is not on the power supply base when the kettle body placed on the power supply base is moved upward.

13. The electric kettle as defined in claim 12, wherein the first spring is on the second detection part.

14. The electric kettle as defined in claim 2, wherein:

the detection part includes a first spring that is on at least one of the first and second detection parts and is expandable and compressible in an up-down direction, and the first spring has a stroke length in the up-down direction such that the power supply connection part and the power receiving connection part are disconnected after the detection part detects that the kettle body is not on the power supply base when the kettle body placed on the power supply base is moved upward.

15. The electric kettle as defined in claim 14, wherein the first spring is on the second detection part.

16. The electric kettle as defined in claim 1, wherein:

at least one of the power supply connection part and the power receiving connection part includes a second spring that is expandable and compressible in an up-down direction, and the second spring has a stroke length in the up-down direction such that the power supply connection part and the power receiving connection part are disconnected after the detection part detects that the kettle body is not on the power supply base when the kettle body placed on the power supply base is moved upward.

17. The electric kettle as defined in claim 1, wherein:

the power supply connection part has a power supply connection terminal, the power receiving connection part has a power receiving connection terminal, and the power supply connection terminal and the power receiving connection terminal are configured such that one of the power supply connection terminal and the power receiving connection terminal sandwich the other and to be electrically connected to each other.

18. The electric kettle as defined in claim 17, wherein:

the first detection part is at a different position from the power supply connection part on the power supply base, and the second detection part is at a different position from the power receiving connection part on the kettle body, the detection part is configured to detect that the kettle body is on the power supply base when the first detection part and the second detection part are in contact with each other, and to detect that the kettle body is not on the power supply base when the first detection part and the second detection part are not in contact with each other, the first detection part is on an upper surface of the power supply base, and the power supply connection terminal is on the upper surface of the power supply base, protrudes upward from the upper surface, and extends in an up-down direction such that an upper end of the power supply connection terminal is located above an upper end of the first detection part.

19. The electric kettle as defined in claim 1, further comprising:

a control part that is configured to control power supply to the heater via the power supply connection part and the power receiving connection part, wherein:

the control part is configured to supply power to the heater via the power supply connection part and the power receiving connection part when the detection part detects that the kettle body is on the power supply base, and to stop power supply to the heater via the power supply connection part and the power receiving connection part when the detection part detects that the kettle body is not on the power supply base.

\* \* \* \* \*